(12) United States Patent
Filippov et al.

(10) Patent No.: US 12,684,116 B2
(45) Date of Patent: Jul. 14, 2026

(54) INTRA-PREDICTION APPARATUS FOR REMOVING A DIRECTIONAL INTRA-PREDICTION MODE FROM A SET OF PREDETERMINED DIRECTIONAL INTRA-PREDICTION MODES

(71) Applicant: HUAWEI TECHNOLOGIES CO., LTD., Shenzhen (CN)

(72) Inventors: Alexey Konstantinovich Filippov, Moscow (RU); Vasily Alexeevich Rufitskiy, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/788,066

(22) Filed: Jul. 29, 2024

(65) Prior Publication Data

US 2024/0388701 A1     Nov. 21, 2024

Related U.S. Application Data

(63) Continuation of application No. 18/330,178, filed on Jun. 6, 2023, now Pat. No. 12,075,032, which is a
(Continued)

(51) Int. Cl.
H04N 19/11          (2014.01)
H04N 19/105         (2014.01)
(Continued)

(52) U.S. Cl.
CPC ........... H04N 19/11 (2014.11); H04N 19/105 (2014.11); H04N 19/119 (2014.11);
(Continued)

(58) Field of Classification Search
None
See application file for complete search history.

(56) References Cited

U.S. PATENT DOCUMENTS

2013/0101036 A1     4/2013   Zhou
2014/0126627 A1     5/2014   Fang et al.
(Continued)

FOREIGN PATENT DOCUMENTS

CN        103067699 A     4/2013
CN        104602011 A     5/2015
(Continued)

OTHER PUBLICATIONS

"Information technology—High efficiency coding and media delivery in heterogeneous environments—Part 2: High efficiency video coding," ISO/IEC 23008-2:2013, pp. 1-13, International Standard (Dec. 2013).
(Continued)

*Primary Examiner* — Christopher Braniff
(74) *Attorney, Agent, or Firm* — Leydig, Voit & Mayer, Ltd.

(57)          ABSTRACT

An intra-prediction method includes: determining, by an intra-prediction apparatus, a directional intra-prediction mode for a rectangular video coding block from an extended set of directional intra-prediction modes, wherein the extended set of directional intra-prediction modes includes extended directional intra-prediction modes and conventional directional intra-prediction modes and determining, by the intra-prediction apparatus, a plurality of available reference samples based on a direction of the directional intra-prediction mode. The method further includes: intra-predicting, by the intra-prediction apparatus, pixel values of pixels of the rectangular video coding block based on the plurality of available reference samples.

20 Claims, 19 Drawing Sheets

Related U.S. Application Data continuation of application No. 17/334,267, filed on May 28, 2021, now Pat. No. 11,716,466, which is a continuation of application No. 16/449,121, filed on Jun. 21, 2019, now Pat. No. 11,025,908, which is a continuation of application No. PCT/RU2016/000915, filed on Dec. 23, 2016.

(51) Int. Cl.

| | |
|---|---|
| *H04N 19/119* | (2014.01) |
| *H04N 19/136* | (2014.01) |
| *H04N 19/139* | (2014.01) |
| *H04N 19/176* | (2014.01) |
| *H04N 19/593* | (2014.01) |
| *H04N 19/70* | (2014.01) |

(52) U.S. Cl.
CPC ......... *H04N 19/136* (2014.11); *H04N 19/139* (2014.11); *H04N 19/176* (2014.11); *H04N 19/593* (2014.11); *H04N 19/70* (2014.11)

(56) References Cited

U.S. PATENT DOCUMENTS

| | | | | |
|---|---|---|---|---|
| 2014/0140404 | A1 | 5/2014 | Liu et al. | |
| 2015/0016516 | A1 | 1/2015 | Saxena et al. | |
| 2015/0078438 | A1 | 3/2015 | Lim et al. | |
| 2015/0078447 | A1 | 3/2015 | Gamei et al. | |
| 2015/0156486 | A1 | 6/2015 | Miyoshi | |
| 2016/0080773 | A1* | 3/2016 | Nakamura | H04N 19/186 |
| | | | | 375/240.12 |
| 2017/0180742 | A1 | 6/2017 | Maani et al. | |

FOREIGN PATENT DOCUMENTS

| | | | |
|---|---|---|---|
| CN | 104935925 | A | 9/2015 |
| EP | 2587805 | A2 | 5/2013 |
| EP | 2665266 | A1 | 11/2013 |
| EP | 2745519 | A1 | 6/2014 |
| WO | 2012161445 | A2 | 11/2012 |
| WO | 2012167119 | A1 | 12/2012 |
| WO | 2012170812 | A1 | 12/2012 |
| WO | 2013023518 | A1 | 2/2013 |
| WO | 2013082291 | A2 | 6/2013 |

OTHER PUBLICATIONS

Sullivan et al. "Overview of the High Efficiency Video Coding (HEVC) Standard," in IEEE Transactions on Circuits and Systems for Video Technology, vol. 22, No. 12, pp. 1649-1668, Institute of Electrical and Electronics Engineers—New York, New York (Dec. 2012).

Sullivan et al. "Future video coding: Joint Exploration Model 1 (JEM1) for future video coding investigation," ITU-T SG16 Q6, TD 213 (WP 3/16), Geneva, pp. 1-20, International Union of Telecommunication—Geneva, Switzerland (Oct. 12-23, 2015).

Huang et al., "EE2.1: Quadtree plus binary tree structure integration with JEM tools," Joint Video Exploration Team (JVET) of ITU-T SG 16 WP 3 and ISO/IEC JTC 1/SC 29/WG 11, JVET-C0024, 3rd Meeting: Geneva, CH, pp. 1-5, International Union of Telecommunication—Geneva, Switzerland (May 26-Jun. 1, 2016).

"Series H: Audiovisual and Multimedia Systems Infrastructure of audiovisual services—Coding of moving video, Advanced video coding for generic audiovisual services," pp. 1-804, International Union of Telecommunication—Geneva, Switzerland (Oct. 2016).

"Series H: Audiovisual and Multimedia Systems Infrastructure of audiovisual services—Coding of moving video, High efficiency video coding" ITU-T H.265, pp. 1-634, International Union of Telecommunication—Geneva, Switzerland (Apr. 2015).

Liu et al., "Rectangular (2NxN and Nx2N) Intra Prediction," Joint Collaborative Team on Video Coding (JCT-VC) of ITU-T SG16 WP3 and ISO/IEC JTC1/SC29/WG11, 7th Meeting: Geneva, JCTVC-G135, WG11 No. 21687, 7th Meeting: Geneva, Nov. 21-30, 2011, pp. 1-6, XP030110119, International Union of Telecommunication—Geneva, Switzerland (Nov. 21-30, 2011).

Chen et al., "Algorithm Description of Joint Exploration Test Model 4," Joint Video Exploration Team (JVET) of ITU-T SG 16 WP 3 and ISO/IEC JTC 1/SC 29/WG 11, JVET-D1001-v1, 4th Meeting: Chengdu, CN, pp. 1-38, XP030150460, International Union of Telecommunication—Geneva, Switzerland (Oct. 15-21, 2016).

Zhao et al., "CE3-related: Unification of angular intra prediction for square and non-square blocks," Joint Video Experts Team (JVET) of ITU-T SG 16 WP3 and ISO/IEC JTC1/SC29/WG11, 12th Meeting: Macao, CN, Document: JVET-L0279, total 10 pages (Oct. 3-12, 2018).

Racapé et al., "CE3-related: Wide-angle intra prediction for non-square blocks," Joint Video Experts Team (JVET) of ITU-T SG 16 WP3 and ISO/IEC JTC1/SC29/WG11, 11th Meeting: Ljubljana, SI, Document: JVET-K0500_r4, total 13 pages (Jul. 10-18, 2018).

* cited by examiner

401 Selecting

403 Determining

405 Determining

407 Comparing

409 Removing

411 Intra-predicting

400

0: Planar
1: DC

Unmodified

Proposed $$R_{asp} = \frac{L_{shorter}}{L_{longer}}$$

INTRA-PREDICTION APPARATUS FOR REMOVING A DIRECTIONAL INTRA-PREDICTION MODE FROM A SET OF PREDETERMINED DIRECTIONAL INTRA-PREDICTION MODES

CROSS-REFERENCE TO RELATED APPLICATIONS

This application is a continuation of U.S. application Ser. No. 18/330,178, filed on Jun. 6, 2023, which is a continuation of U.S. application Ser. No. 17/334,267, filed on May 28, 2021, now U.S. Pat. No. 11,716,466, which is a continuation of U.S. Application No. 16/449, 121, filed on Jun. 21, 2019, now U.S. Pat. No. 11,025,908, which is a continuation of International Application No. PCT/RU2016/000915, filed on Dec. 23, 2016. All of the aforementioned patent applications are hereby incorporated by reference in their entireties.

TECHNICAL FIELD

Generally, the present disclosure relates to the field of video coding. The present disclosure relates to an apparatus for directional intra-prediction of a video coding block as well as an encoding apparatus and a decoding apparatus comprising such an intra-prediction apparatus.

BACKGROUND

Digital video communication and storage applications are implemented by a wide range of digital devices, e.g. digital cameras, cellular radio telephones, laptops, broadcasting systems, video teleconferencing systems, etc. One of the most important and challenging tasks of these applications is video compression. The task of video compression is complex and is constrained by two contradicting parameters: compression efficiency and computational complexity. Video coding standards, such as ITU-T H.264/AVC or ITU-T H.265/HEVC, provide a good tradeoff between these parameters. For that reason support of video coding standards is a mandatory requirement for almost any video compression application.

The state-of-the-art video coding standards are based on partitioning of a source picture into video coding blocks (or short blocks). Processing of these blocks depends on their size, spatial position and a coding mode specified by an encoder. Coding modes can be classified into two groups according to the type of prediction: intra-and inter-prediction modes. Intra-prediction modes use pixels of the same picture (also referred to as frame or image) to generate reference samples to calculate the prediction values for the pixels of the block being reconstructed. Intra-prediction is also referred to as spatial prediction. Inter-prediction modes are designed for temporal prediction and uses reference samples of previous or next pictures to predict pixels of the block of the current picture. After a prediction stage, transform coding is performed for a prediction error that is the difference between an original signal and its prediction. Then, the transform coefficients and side information are encoded using an entropy coder (e.g., CABAC for AVC/H.264 and HEVC/H.265). The recently adopted ITU-T H.265/HEVC standard (ISO/IEC 23008-2: 2013, "Information technology—High efficiency coding and media delivery in heterogeneous environments—Part 2: High efficiency video coding", November 2013) declares a set of state-of-the-art video coding tools that provide a reasonable tradeoff between coding efficiency and computational complexity. An overview on the ITU-T H.265/HEVC standard has been given by Gary J. Sullivan, "Overview of the High Efficiency Video Coding (HEVC) Standard", in IEEE Transactions on Circuits and Systems for Video Technology, Vol. 22, No. 12, December 2012, the entire content of which is incorporated herein by reference.

Similar to the ITU-T H.264/AVC video coding standard, the HEVC/H.265 video coding standard provides for a division of the source picture into blocks, e.g., coding units (CUs). Each of the CUs can be further split into either smaller CUs or prediction units (PUs). A PU can be intra-or inter-predicted according to the type of processing applied for the pixels of PU. In case of inter-prediction, a PU represents an area of pixels that is processed by motion compensation using a motion vector specified for a PU. For intra prediction, the adjacent pixels of neighbor blocks are used as reference samples to predict a current block. A PU specifies a prediction mode that is selected from the set of intra-prediction modes for all the transform units (TUs) contained in this PU. A TU can have different sizes (e.g., 4×4, 8×8, 16×16 and 32×32 pixels) and can be processed in different ways. For a TU, transform coding is performed, i.e. the prediction error is transformed with a discrete cosine transform or a discrete sine transform (in the HEVC/H.265 standard, it is applied to intra-coded blocks) and quantized. Hence, reconstructed pixels contain quantization noise (it can become apparent, for examples, as blockiness between units, ringing artifacts along with sharp edges, etc.) that in-loop filters such as Deblocking Filter (DBF), Sample Adaptive Offset (SAO) and Adaptive Loop Filter (ALF) try to suppress. The use of sophisticated prediction coding (such as motion compensation and intra-prediction) and partitioning techniques (e.g., quadtree for CUs and PUs as well as residual quadtree for TUs in the HEVC/H.265 standard and quadtree plus binary tree for the JEM reference software starting from version JEM-3.0) allowed the standardization committee to significantly reduce the redundancy in PUs.

According to the HEVC/H.265 standard, the intra prediction modes as shown in FIG. 5 include a planar mode (the intra-prediction mode index is 0), DC mode (the intra-prediction mode index is 1), and 33 directional modes (the intra-prediction mode index ranges from 2 to 34, indicated by the solid lines). The set of directional intra-prediction modes was extended up to 65 modes (almost doubled) by decreasing a step angle between directional intra-prediction modes by a factor of 2. The dotted lines in FIG. 5 denote the angular modes, which are introduced in the JEM software.

For the JEM-3.0 software, a new partitioning mechanism based on both quad-tree and binary-tree (known as QTBT) was proposed. The fundamental difference between the QT and QTBT partitioning mechanisms is that the latter one enables not only square but also rectangular blocks by using partitioning based on both quad-and binary-tree. FIGS. 6(a) and 6(b) illustrate an example of block partitioning and a corresponding tree structure by using QTBT, wherein solid lines denote quad-tree partitioning and dashed lines denote binary-tree partitioning. In each partitioning node of the binary-tree, the partitioning type is indicated by 0 (horizontal partitioning) or 1 (vertical partitioning).

Some signaling overhead and increased computational complexity at the encoder side are the price of the QTBT partitioning as compared to conventional quad-tree based partitioning used in the HEVC/H.265 standard. Nevertheless, the QTBT-based partitioning is endowed with better segmentation properties and demonstrates significantly higher coding efficiency than the conventional quad-tree ("EE2.1: Quadtree plus binary tree structure integration with JEM tools," Contribution JVET-C0024 to the $3^{rd}$ JVET meeting, Geneva, Switzerland, May 2016 by Han Huang, Kai Zhang, Yu-Wen Huang, Shawmin Lei). However, the QTBT partitioning has a critical problem: a set of available directional intra-prediction modes has not been changed accordingly. Thus, the asymmetrical nature of rectangular blocks utilized by the QTBT framework has not been taken into account, as shown in FIGS. 7(a) and 7(b), i.e., the same number of reference samples are used along both shorter and longer sides of rectangular blocks. Therefore, the number of directional intra-prediction modes depends on neither aspect ratio of blocks nor actual availability of reference samples in the current implementation of the QTBT framework.

In light of the above, there is a need for apparatuses and methods for video coding which allow for an efficient handling of rectangular video coding blocks.

SUMMARY

It is an object to provide apparatuses and methods for video coding, which allow for an efficient handling of rectangular video coding blocks in conjunction with a directional intra-prediction mechanism.

The foregoing and other objects are achieved by the subject matter of the present disclosure.

The following disclosure employs a plurality of terms which, in embodiments, have the following meaning:

Slice—a spatially distinct region of a picture that is independently encoded/decoded.

Slice header-Data structure configured to signal information associated with a particular slice. Video coding block (or short block)—an M×N (M-column by N-row) array of pixels or samples (each pixel/sample being associated with at least one pixel/sample value), or an M×N array of transform coefficients.

Coding Tree Unit (CTU) grid—a grid structure employed to partition blocks of pixels into macro-blocks for video encoding.

Coding Unit (CU)—a coding block of luma samples, two corresponding coding blocks of chroma samples of an image that has three sample arrays, or a coding block of samples of a monochrome picture or a picture that is coded using three separate color planes and syntax used to code the samples.

Picture Parameter Set (PPS)—a syntax structure containing syntax elements that apply to zero or more entire coded pictures as determined by a syntax element found in each slice segment header.

Sequence Parameter Set (SPS)—a syntax structure containing syntax elements that apply to zero or more entire coded video sequences as determined by the content of a syntax element found in the PPS referred to by a syntax element found in each slice segment header.

Video Parameter Set (VPS)—a syntax structure containing syntax elements that apply to zero or more entire coded video sequences.

Prediction Unit (PU)—a prediction block of luma samples, two corresponding prediction blocks of chroma samples of a picture that has three sample arrays, or a prediction block of samples of a monochrome picture or a picture that is coded using three separate color planes and syntax used to predict the prediction block samples.

Transform Unit (TU)—a transform block of luma samples, two corresponding transform blocks of chroma samples of a picture that has three sample arrays, or a transform block of samples of a monochrome picture or a picture that is coded using three separate color planes and syntax used to predict the transform block samples.

Supplemental enhancement information (SEI)—extra information that may be inserted into a video bit-stream to enhance the use of the video.

Luma—information indicating the brightness of an image sample.

Chroma—information indicating the color of an image sample, which may be described in terms of red difference chroma component (Cr) and blue difference chroma component (Cb).

Generally, the present disclosure relates to an apparatus and a method for improving the directional intra-prediction mechanism within the QTBT framework. The present disclosure extends a set of available directional intra-prediction modes subject to the aspect ratio of a block to be predicted, enables or disables some directional intra-prediction modes subject to the availability of reference samples, and signals directional intra-prediction modes contained in the extended subset via mode mapping and a one-bit flag.

Embodiments described in the present disclosure provide, amongst others, the following advantages: additional coding gain after integrating this technique into a codec, extensive applications in hybrid video coding paradigms compatible with the HM software and the VPX video codec family as well as in the state-of-the-art and next-generation video coding frameworks (the JEM software and VPX/AV1 video codec family respectively), low hardware and computational complexities at both encoder and decoder sides, and easy implementation in such codecs that use conventional directional intra-prediction mechanisms.

According to a first aspect, the disclosure relates to an intra-prediction apparatus for removing a directional intra-prediction mode of a rectangular video coding block from a set of predetermined directional intra-prediction modes, each predetermined directional intra-prediction mode of the set of predetermined directional intra-prediction modes being associated with a predetermined direction, the rectangular video coding block having a first side and a second side, a length ($L_{longer}$) of the first side being greater than a length ($L_{shorter}$) of the second side. The intra-prediction apparatus comprises a reference sample determining unit configured to select the directional intra-prediction mode from the set of predetermined directional intra-prediction modes, to determine a plurality of available reference samples on the basis of a predetermined direction of the directional intra-prediction mode, the available reference samples extending along the first side of the rectangular video coding block, and to determine a length ($L_{RSlonger}$) associated with the plurality of available reference samples, a directional intra-prediction mode removing unit configured to compare the length ($L_{longer}$) of the first side with the length ($L_{RSlonger}$) associated with the plurality of available reference samples, and to remove the directional intra-prediction mode from the set of predetermined directional intra-prediction modes if the length ($L_{RSlonger}$) associated with the plurality of available reference samples is smaller than a multiple of the length ($L_{longer}$) of the first side for obtaining a reduced set of predetermined directional intra-prediction modes, and an intra-prediction unit configured to intra-predict pixel values of pixels of the rectangular video coding block on the basis of the reduced set of predetermined directional intra-prediction modes.

In this regard, the term "direction" refers to an orientation within the video coding block to be used for directional intra-prediction within the video coding block. The term "directional range" refers to range covering a plurality of said directions.

In a first implementation form of the intra-prediction apparatus according to the first aspect as such, the directional intra-prediction mode removing unit is configured to remove the directional intra-prediction mode from the set of predetermined directional intra-prediction modes if the length ($L_{RSlonger}$) associated with the plurality of available reference samples is smaller than twice the length ($L_{longer}$) of the first side. In this case, the multiple is two.

In a second implementation form of the intra-prediction apparatus according to the first aspect as such or any preceding implementation form of the first aspect, the intra-prediction apparatus further comprises an area determining unit configured to determine a non-prediction area ($S_{uncov}$) within the rectangular video coding block upon the basis of the length ($L_{shorter}$) of the second side and the predetermined direction of the directional intra-prediction mode.

In a third implementation form of the intra-prediction apparatus according to the second implementation form of the first aspect, the area determining unit is configured to determine the non-prediction area ($S_{uncov}$) within the rectangular video coding block upon the basis of the following equation:

$$S_{uncon} = \frac{L_{shorter}^2 \cdot \tan \gamma}{2}$$

wherein $S_{uncov}$ denotes the non-prediction area, $L_{shorter}$ denotes the length of the second side, and $\gamma$ denotes an angle associated with the predetermined direction of the directional intra-prediction mode.

In a fourth implementation form of the intra-prediction apparatus according to the second implementation form or the third implementation form of the first aspect, the area determining unit is further configured to determine a fractional non-prediction area ($P_{area}$) within the rectangular video coding block upon the basis of the length ($L_{longer}$) of the first side, the length ($L_{shorter}$) of the second side, and the predetermined direction of the directional intra-prediction mode.

In a fifth implementation form of the intra-prediction apparatus according to the fourth implementation form of the first aspect, the area determining unit is configured to determine the fractional non-prediction area ($P_{area}$) within the rectangular video coding block upon the basis of the following equation:

$$P_{area} = \frac{L_{shorter}}{L_{longer}} \cdot \frac{\tan \gamma}{2}$$

wherein $P_{area}$ denotes the fractional non-prediction area, $L_{longer}$ denotes the length of the first side, $L_{shorter}$ denotes the length of the second side, and $\gamma$ denotes the angle associated with the predetermined direction of the directional intra-prediction mode.

In a sixth implementation form of the intra-prediction apparatus according to the first aspect as such or any preceding implementation form of the first aspect, the rectangular video coding block is a coding unit (CU), a prediction unit (PU), or a transform unit (TU).

According to a second aspect, the disclosure relates to an encoding apparatus for encoding a rectangular video coding block. The encoding apparatus comprises an intra-prediction apparatus according to the first aspect as such or any implementation form of the first aspect for providing a predicted rectangular video coding block, and an encoding unit configured to encode the rectangular video coding block on the basis of the predicted rectangular video coding block.

According to a third aspect, the disclosure relates to a decoding apparatus for decoding an encoded rectangular video coding block. The decoding apparatus comprises an intra-prediction apparatus according to the first aspect as such or any implementation form of the first aspect for providing a predicted rectangular video coding block, and a restoration unit configured to restore a rectangular video coding block on the basis of an encoded rectangular video coding block and the predicted rectangular video coding block.

According to a fourth aspect, the disclosure relates to an intra-prediction method for removing a directional intra-prediction mode of a rectangular video coding block from a set of predetermined directional intra-prediction modes, each predetermined directional intra-prediction mode of the set of predetermined directional intra-prediction modes being associated with a predetermined direction, the rectangular video coding block having a first side and a second side, a length ($L_{longer}$) of the first side being greater than a length ($L_{shorter}$) of the second side. The intra-prediction method comprises selecting the directional intra-prediction mode from the set of predetermined directional intra-prediction modes, determining a plurality of available reference samples on the basis of a predetermined direction of the directional intra-prediction mode, the available reference samples extending along the first side of the rectangular video coding block, determining a length ($L_{RSlonger}$) associated with the plurality of available reference samples, comparing the length ($L_{longer}$) of the first side with the length ($L_{RSlonger}$) associated with the plurality of available reference samples, removing the directional intra-prediction mode from the set of predetermined directional intra-prediction modes if the length ($L_{RSlonger}$) associated with the plurality of available reference samples is smaller than a multiple of the length ($L_{longer}$) of the first side for obtaining a reduced set of predetermined directional intra-prediction modes, and intra-predicting pixel values of pixels of the rectangular video coding block on the basis of the reduced set of predetermined directional intra-prediction modes.

The intra-prediction method can be performed by the intra-prediction apparatus. Further features of the intra-prediction method directly result from the features or the functionality of the intra-prediction apparatus.

According to a fifth aspect, the disclosure relates to a computer program comprising program code for performing the method according to the fourth aspect as such or any implementation form of the fourth aspect when executed on a computer.

The embodiments can be implemented in hardware and/or software.

BRIEF DESCRIPTION OF THE DRAWINGS

Further embodiments of the invention will be described with respect to the following figures, wherein.

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, exemplary aspects of embodiments of the present invention. It is understood that other aspects may be utilized and structural or logical changes may be made without departing from the scope of the present invention. The following detailed description, therefore, is not to be taken in a limiting sense, as the scope of the present invention is defined be the appended claims.

For instance, it is understood that a disclosure in connection with a described method may also hold true for a corresponding device or system configured to perform the method and vice versa. For example, if a method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
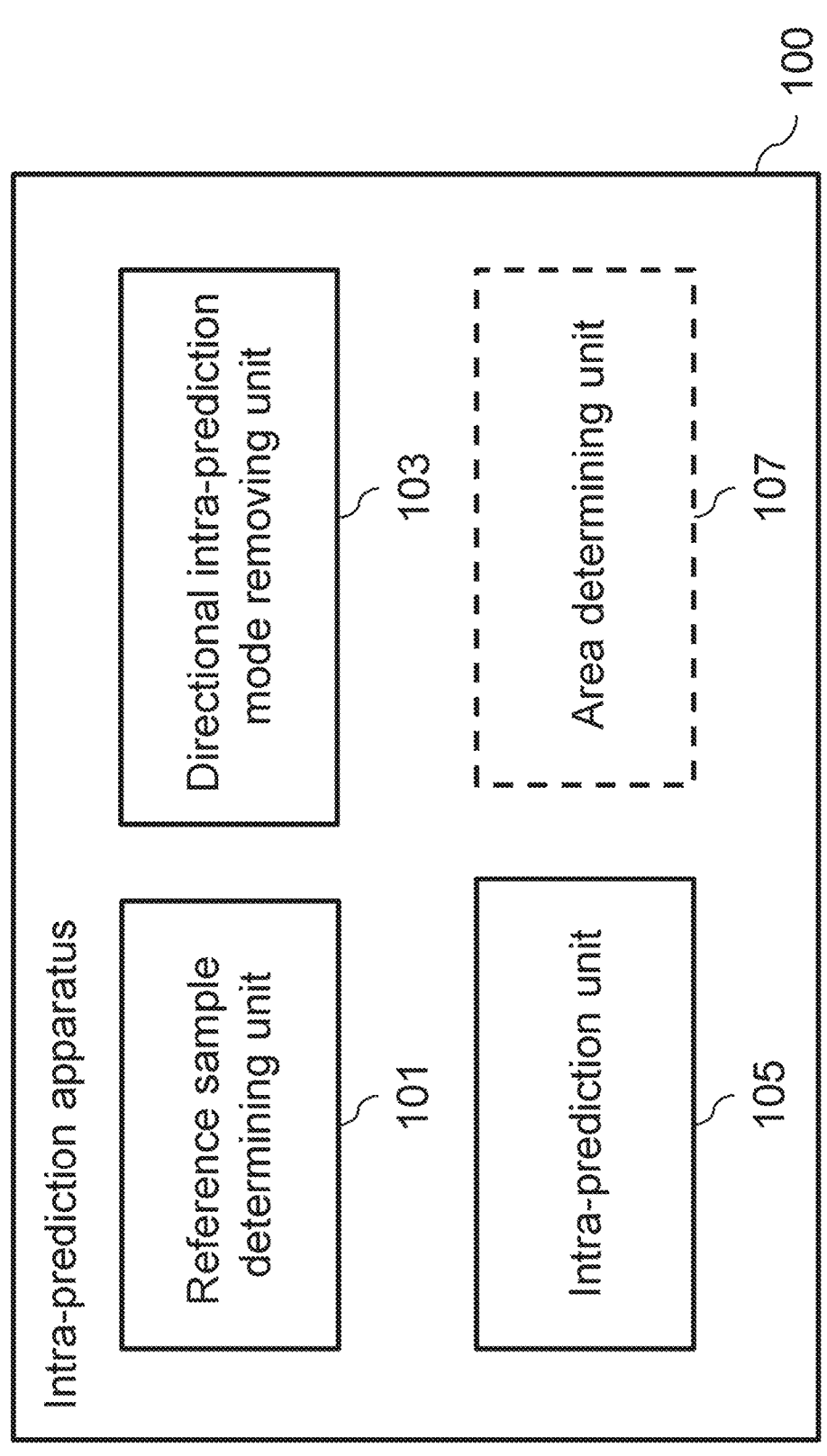
FIG. 1 shows a schematic diagram of an intra-prediction apparatus for removing a directional intra-prediction mode of a rectangular video coding block from a set of predetermined directional intra-prediction modes.

FIG. 1 shows a schematic diagram of an intra-prediction apparatus 100 for removing a directional intra-prediction mode of a rectangular video coding block from a set of predetermined directional intra-prediction modes. Each predetermined directional intra-prediction mode of the set of predetermined directional intra-prediction modes is associated with a predetermined direction, the rectangular video coding block having a first side and a second side, a length ($L_{longer}$) of the first side being greater than a length ($L_{shorter}$) of the second side. The intra-prediction apparatus 100 comprises a reference sample determining unit 101 configured to select the directional intra-prediction mode from the set of predetermined directional intra-prediction modes, to determine a plurality of available reference samples on the basis of a predetermined direction of the directional intra-prediction mode, the available reference samples extending along the first side of the rectangular video coding block, and to determine a length ($L_{RSlonger}$) associated with the plurality of available reference samples, a directional intra-prediction mode removing unit 103 configured to compare the length ($L_{longer}$) of the first side with the length ($L_{RSlonger}$) associated with the plurality of available reference samples, and to remove the directional intra-prediction mode from the set of predetermined directional intra-prediction modes if the length ($L_{RSlonger}$) associated with the plurality of available reference samples is smaller than a multiple of the length ($L_{longer}$) of the first side for obtaining a reduced set of predetermined directional intra-prediction modes, and an intra-prediction unit 105 configured to intra-predict pixel values of pixels of the rectangular video coding block on the basis of the reduced set of predetermined directional intra-prediction modes. The intra-prediction apparatus 100 further comprises an area determining unit 107 configured to determine a non-prediction area ($S_{uncov}$) within the rectangular video coding block upon the basis of the length ($L_{shorter}$) of the second side and the predetermined direction of the directional intra-prediction mode.

Figure 2:
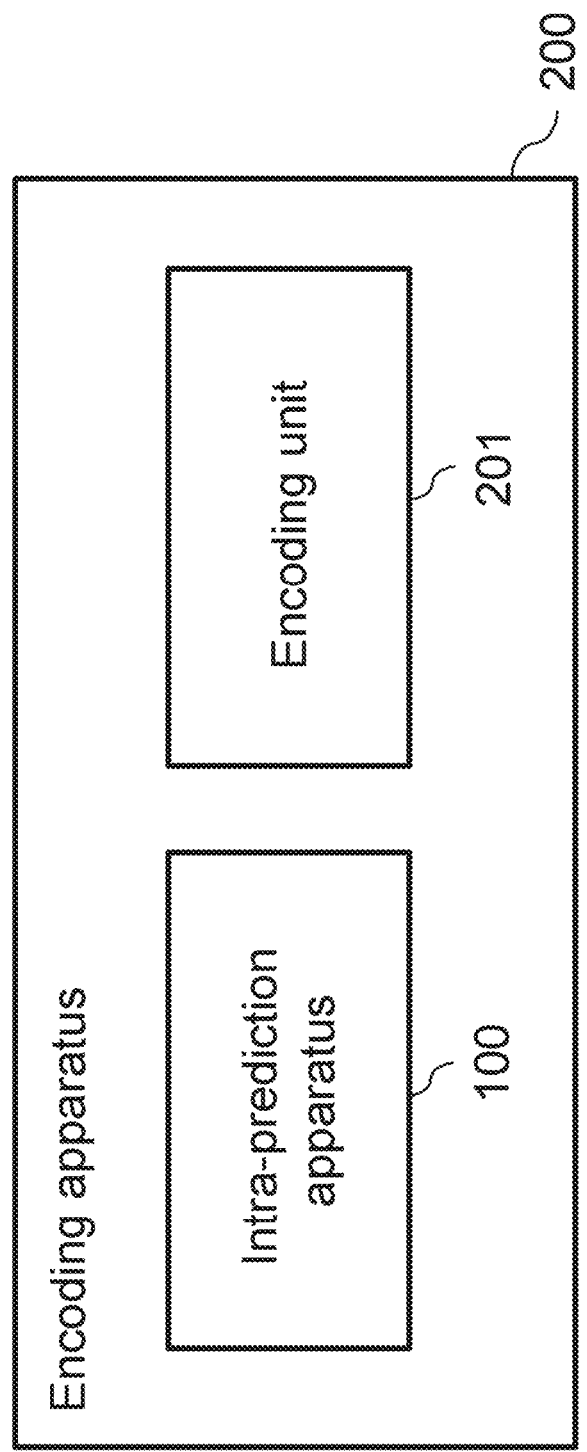
FIG. 2 shows a schematic diagram of an encoding apparatus for encoding a rectangular video coding block.

FIG. 2 shows a schematic diagram of an encoding apparatus 200 for encoding a rectangular video coding block. The encoding apparatus 200 comprises an intra-prediction apparatus 100 for providing a predicted rectangular video coding block, and an encoding unit 201 configured to encode the rectangular video coding block on the basis of the predicted rectangular video coding block.

Figure 3:
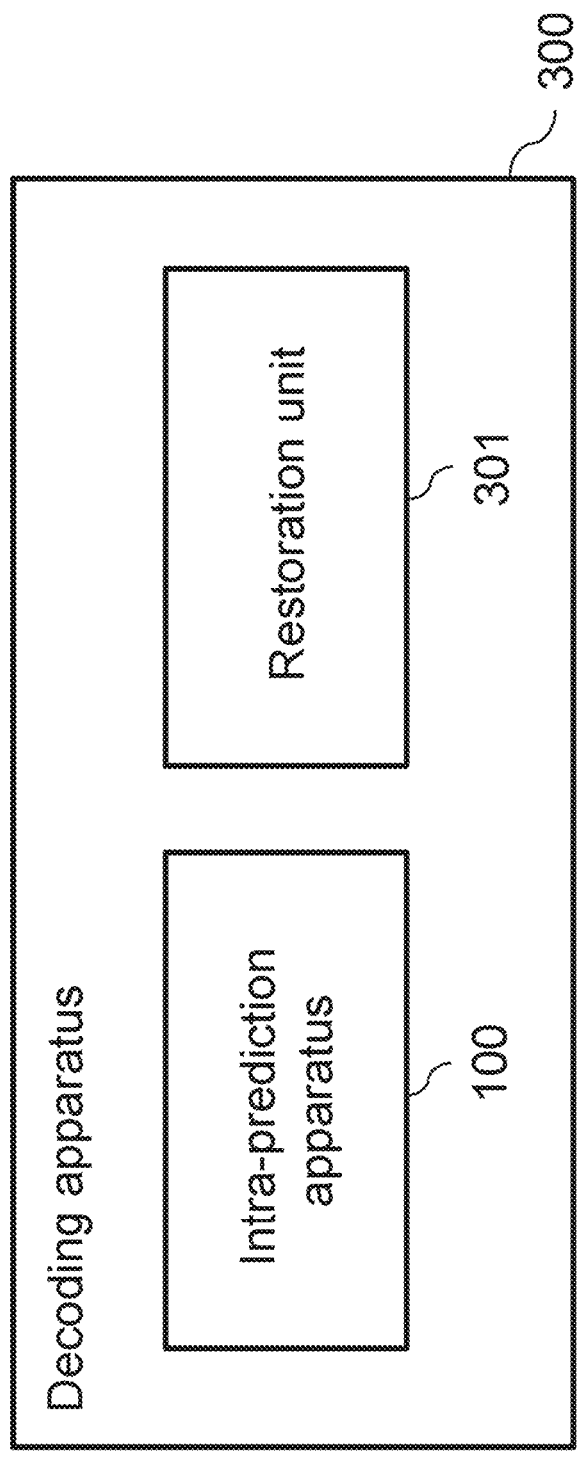
FIG. 3 shows a schematic diagram of a decoding apparatus for decoding an encoded rectangular video coding block.
Figure 4:
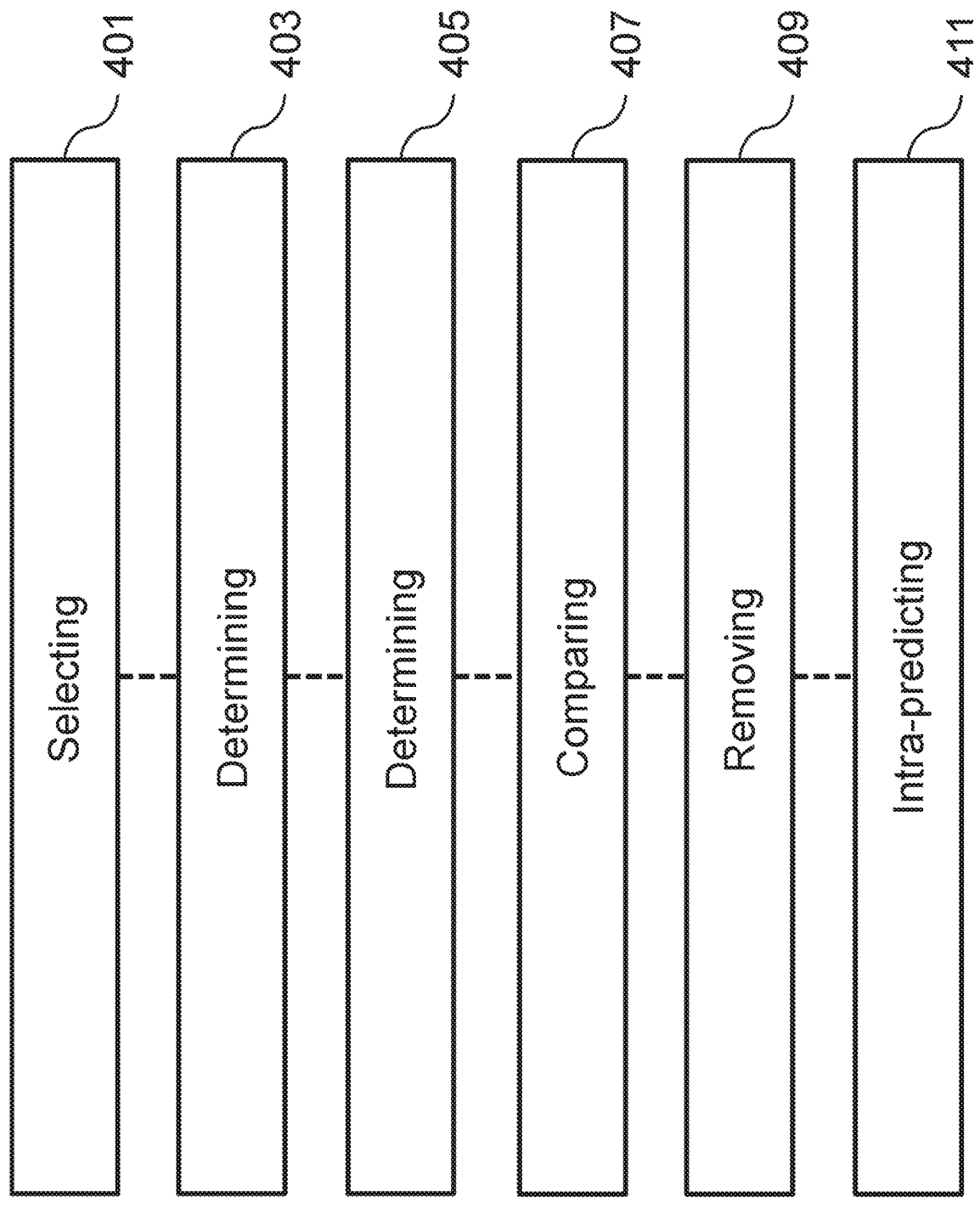
FIG. 4 shows a schematic diagram of an intra-prediction method for removing a directional intra-prediction mode of a rectangular video coding block from a set of predetermined directional intra-prediction modes.

FIG. 3 shows a schematic diagram of a decoding apparatus 300 for decoding an encoded rectangular video coding block. The decoding apparatus 300 comprises an intra-prediction apparatus 100 for providing a predicted rectangular video coding block, and a restoration unit 301 configured to restore a rectangular video coding block on the basis of an encoded rectangular video coding block and the predicted rectangular video coding block. FIG. 4 shows a schematic diagram of an intra-prediction method 400 for removing a directional intra-prediction mode of a rectangular video coding block from a set of predetermined directional intra-prediction modes. Each predetermined directional intra-prediction mode of the set of predetermined directional intra-prediction modes is associated with a predetermined direction, the rectangular video coding block having a first side and a second side, a length ($L_{longer}$) of the first side being greater than a length ($L_{shorter}$) of the second side. The intra-prediction method 400 comprises selecting 401 the directional intra-prediction mode from the set of predetermined directional intra-prediction modes, determining 403 a plurality of available reference samples on the basis of a predetermined direction of the directional intra-prediction mode, the available reference samples extending along the first side of the rectangular video coding block, determining 405 a length ($L_{RSlonger}$) associated with the plurality of available reference samples, comparing 407 the length ($L_{longer}$) of the first side with the length ($L_{RSlonger}$) associated with the plurality of available reference samples, removing 409 the directional intra-prediction mode from the set of predetermined directional intra-prediction modes if the length ($L_{RSlonger}$) associated with the plurality of available reference samples is smaller than a multiple of the length ($L_{longer}$) of the first side for obtaining a reduced set of predetermined directional intra-prediction modes, and intra-predicting 411 pixel values of pixels of the rectangular video coding block on the basis of the reduced set of predetermined directional intra-prediction modes.

Figure 5:
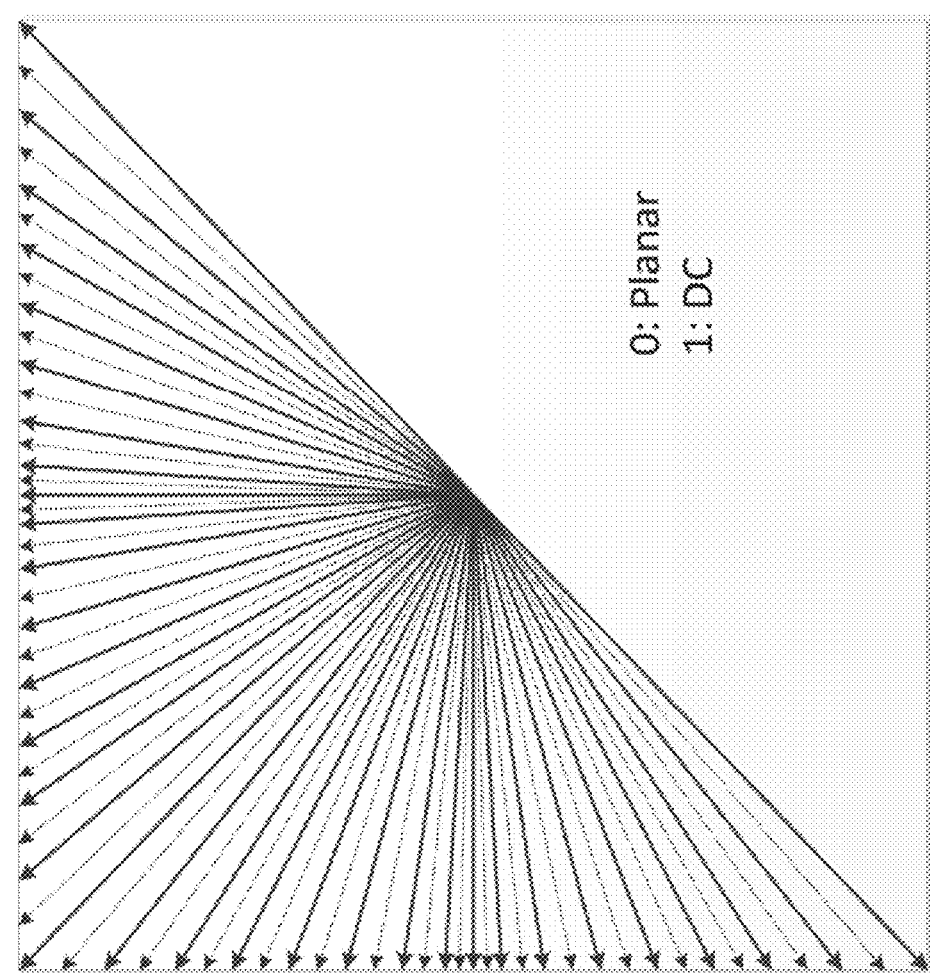
FIG. 5 shows a schematic diagram of a video coding block illustrating different directional intra-prediction modes.

FIG. 5 shows a schematic diagram of a video coding block illustrating different directional intra-prediction modes. The intra prediction modes as shown in FIG. 5 include a planar mode (the intra-prediction mode index is 0), DC mode (the intra-prediction mode index is 1), and 33 directional modes (the intra-prediction mode index ranges from 2 to 34, indicated by the solid lines). The set of directional intra-prediction modes was extended up to 65 modes (almost doubled) by decreasing a step angle between directional intra-prediction modes by a factor of 2. The dotted lines in FIG. 5 denote the angular modes, which are introduced in the JEM software.

Figure 6:
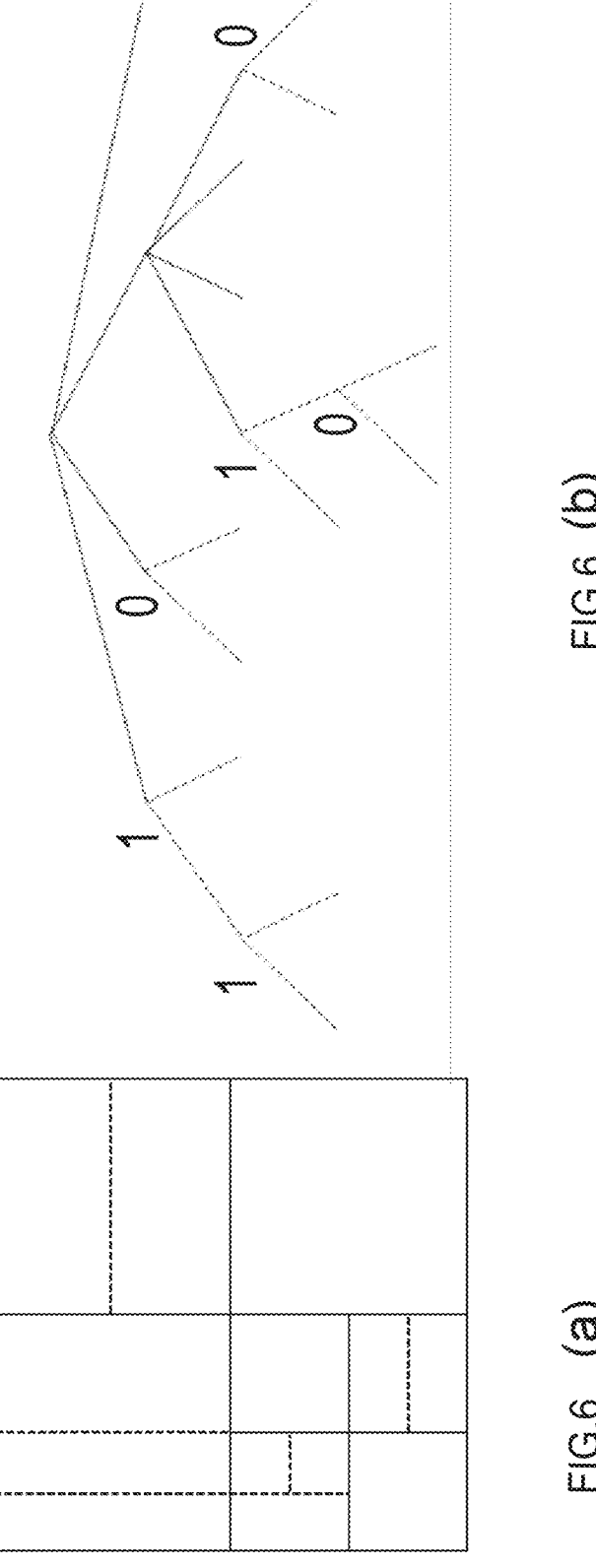
FIGS. 6(a) and 6(b) illustrate an example of block partitioning and a corresponding tree structure by using quad-tree plus binary-tree (QTBT)

FIGS. 6(*a*) and 6(*b*) illustrate an example of block partitioning and a corresponding tree structure by using quad-tree plus binary-tree (QTBT), wherein solid lines denote quad-tree partitioning and dashed lines denote binary-tree partitioning. In each partitioning node of the binary-tree, the partitioning type is indicated by 0 (horizontal partitioning) or 1 (vertical partitioning).

Figure 7:
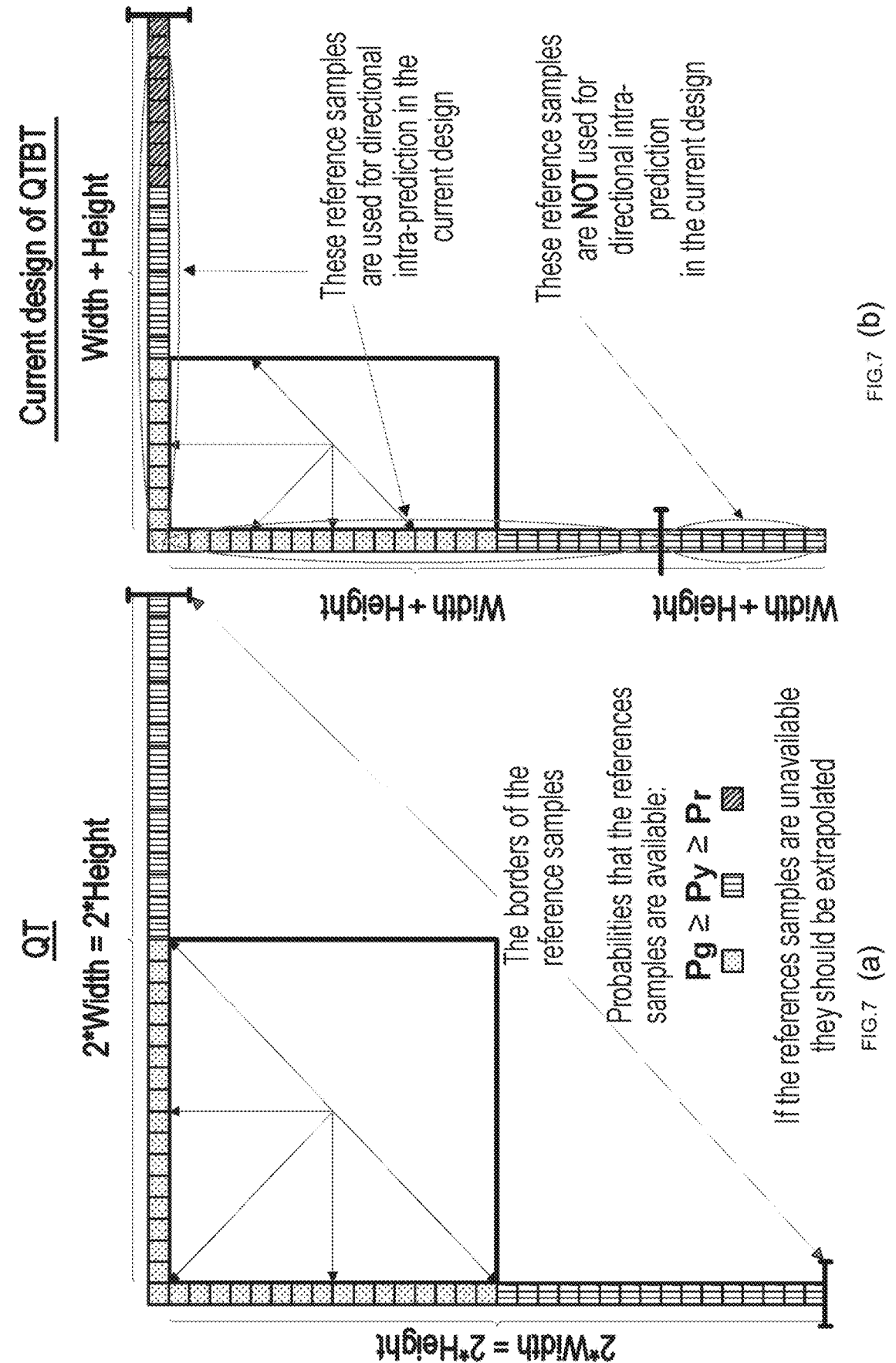
FIGS. 7(a) and 7(b) illustrate implementations of a directional intra-prediction mechanism in quad-tree (QT) and quad-tree plus binary-tree (QTBT) frameworks, respectively.

FIGS. 7(*a*) and 7(*b*) illustrate implementations of a directional intra-prediction mechanism in quad-tree (QT) and quad-tree plus binary-tree (QTBT) frameworks, respectively. Here, the same number of reference samples are used along both shorter and longer sides of rectangular blocks. Therefore, the number of directional intra-prediction modes depends on neither aspect ratio of blocks nor actual availability of reference samples in the current implementation of the QTBT framework.

Figure 8:
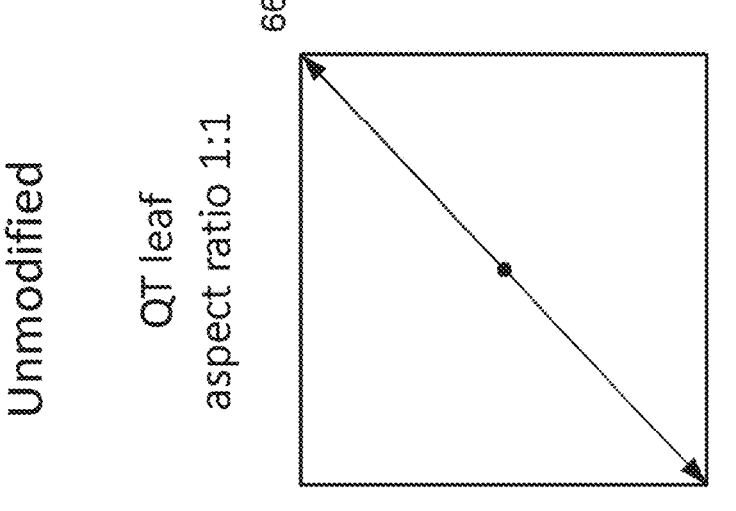
FIGS. 8(a) and 8(b) illustrate an extension of a set of directional intra-prediction modes subject to an aspect ratio of a given rectangular video coding block.
Figure 8:
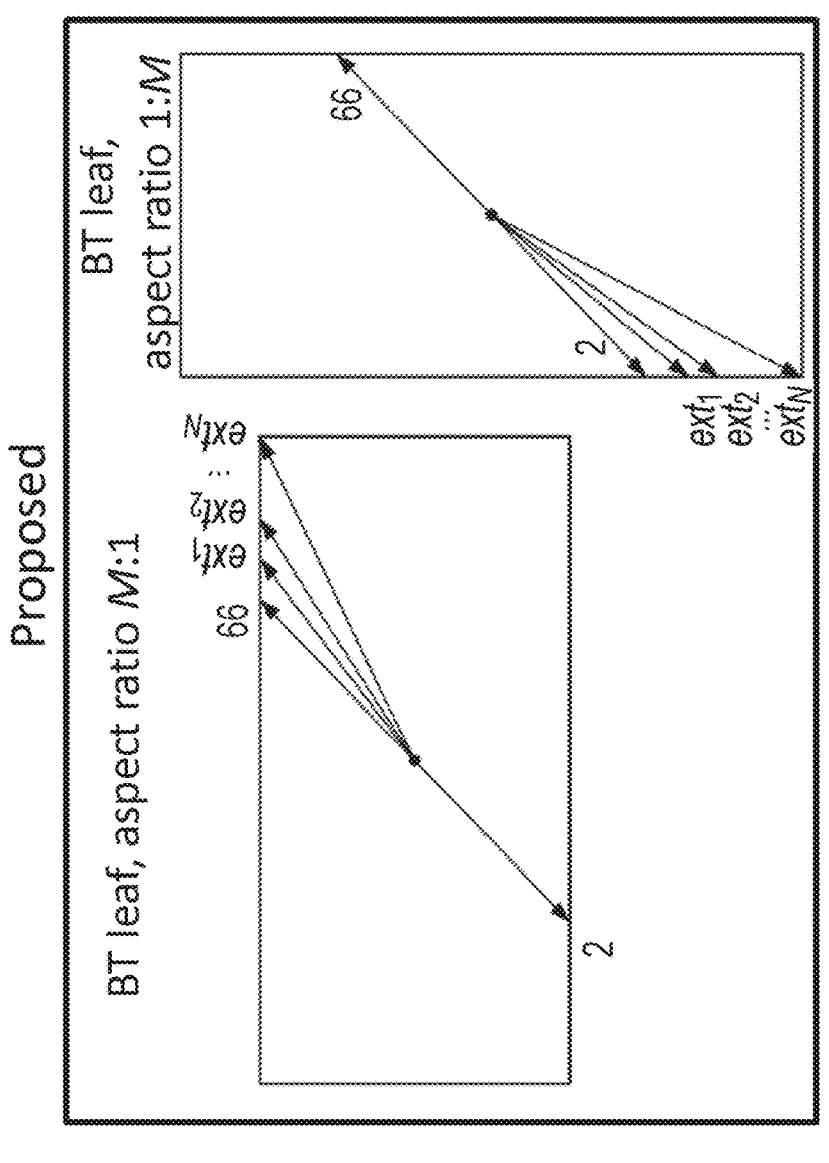

FIGS. 8(*a*) and 8 *b*) illustrate an extension of a set of directional intra-prediction modes subject to an aspect ratio of a given rectangular video coding block. As shown in FIG. 8(*a*), an aspect ratio of a square video coding block is 1:1 and a set of conventional directional intra-prediction modes is used for predicting values of a video coding block being reconstructed. On the other hand, a rectangular video coding block comprises shorter and longer sides, and such asymmetry can be used to improve the current directional intra-prediction mechanism by increasing its prediction accuracy.

As illustrated in FIG. 8(*b*), the number of available directional intra-prediction modes can be increased along a long side.

Figure 9:
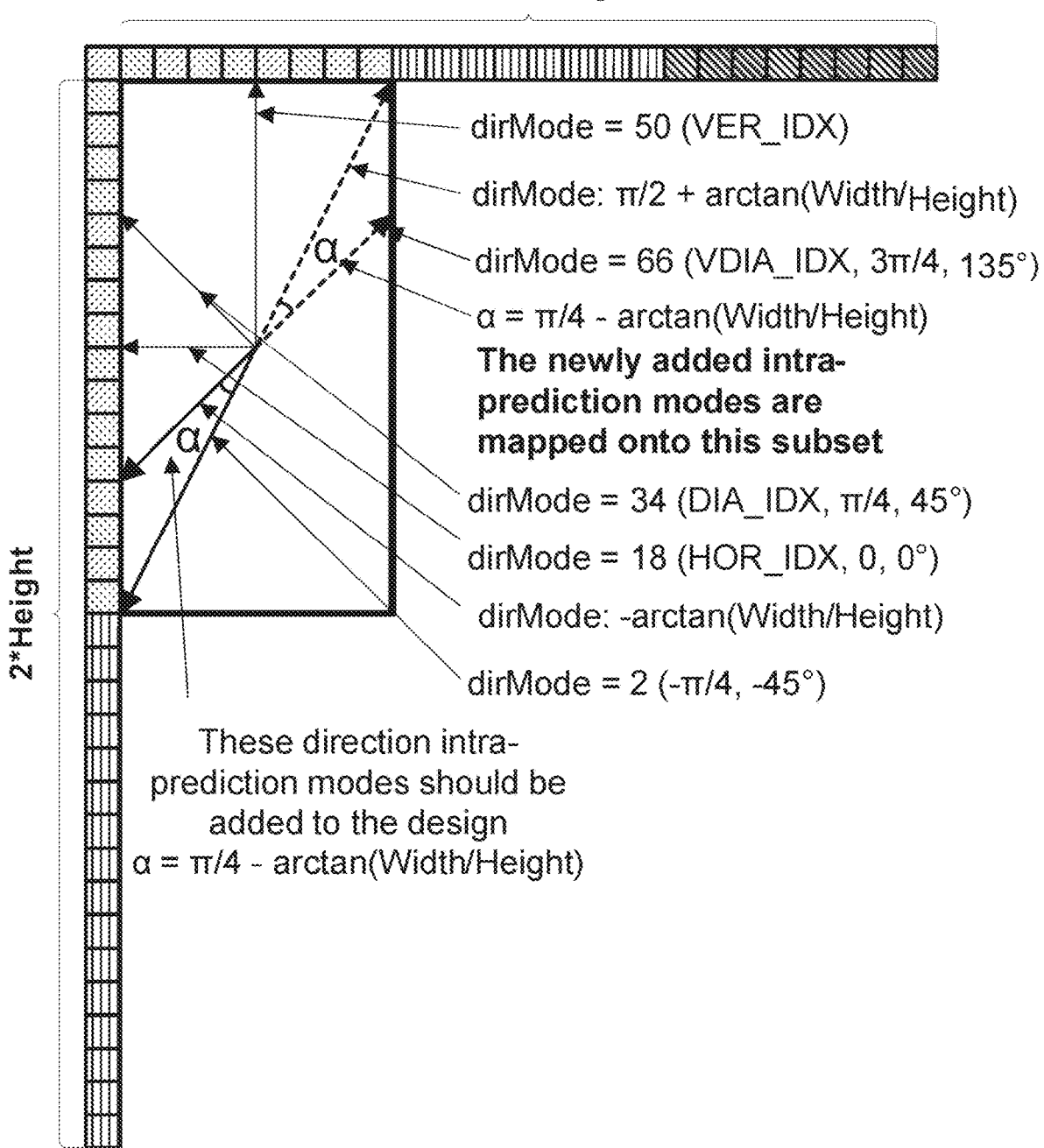
FIG. 9 shows a schematic diagram illustrating an extension of a set of directional intra-prediction modes subject to an aspect ratio of a given rectangular video coding block.

FIG. 9 shows a schematic diagram illustrating an extension of a set of directional intra-prediction modes subject to an aspect ratio of a given rectangular video coding block. The corresponding processing steps may be implemented by the intra-prediction apparatus 100 and/or the intra-prediction method 400. In FIG. 9, square pixels represent reference samples for intra-prediction, wherein the order of probabilities that the reference samples are available is: reference pixel with dots>reference pixel with stripes>reference pixel with diagonal stripes.

The number of the newly introduced directional intra-prediction modes may depend on the aspect ratio of the rectangular video coding block. The angle that encompasses these new modes is defined by the following formula:

$$\alpha = \frac{\pi}{4} - \arctan\left(\frac{L_{shorter}}{L_{longer}}\right)$$

wherein $L_{shorter}$ and $L_{longer}$ are the lengths of the shorter and longer sides of the rectangular video coding block, respectively. As illustrated in FIG. 9, $L_{shorter}$=width and $L_{longer}$=height for a vertical orientation of the rectangular video coding block. The actual number of these modes may depend on the angle between neighbor directional modes and the angle α defined by the above formula.

In the up-to-date version of the JEM software (version JEM-4.0), the average angle step between neighbor directional modes defined by an intra-prediction interpolation filter does not depend on the block size and equals:

$$s = \frac{\pi}{64}$$

Thus, in the case of uniformly spaced directional intra-prediction modes, the number N of the newly introduced modes equals:

$$N = \left\lfloor \frac{\alpha}{s} \right\rfloor = 16 - \left\lfloor \frac{64}{\pi} \arctan\left(\frac{L_{shorter}}{L_{longer}}\right) \right\rfloor$$

wherein $\lfloor \cdot \rfloor$ is a floor operation.

In the embodiment shown in FIG. 9, the number of reference samples is extended along the longer side, and it is not reduced for the shorter side. Therefore, the amount of intra-prediction modes that are available along the longer side (the angle that encompasses these modes is marked by a solid line) is increased, but the number of intra-prediction modes that are available along the shorter side (the angle that encompasses these modes is marked by a dashed line) is not decreased. Hence, the cardinality of the intra-prediction mode set is only increased while the aspect ratio $$R_{asp} = \frac{L_{shorter}}{L_{longer}}$$

is decreasing. On the other hand, another approach to preserve the original number of directional intra-prediction modes is also possible according to another embodiment.

Figure 10:
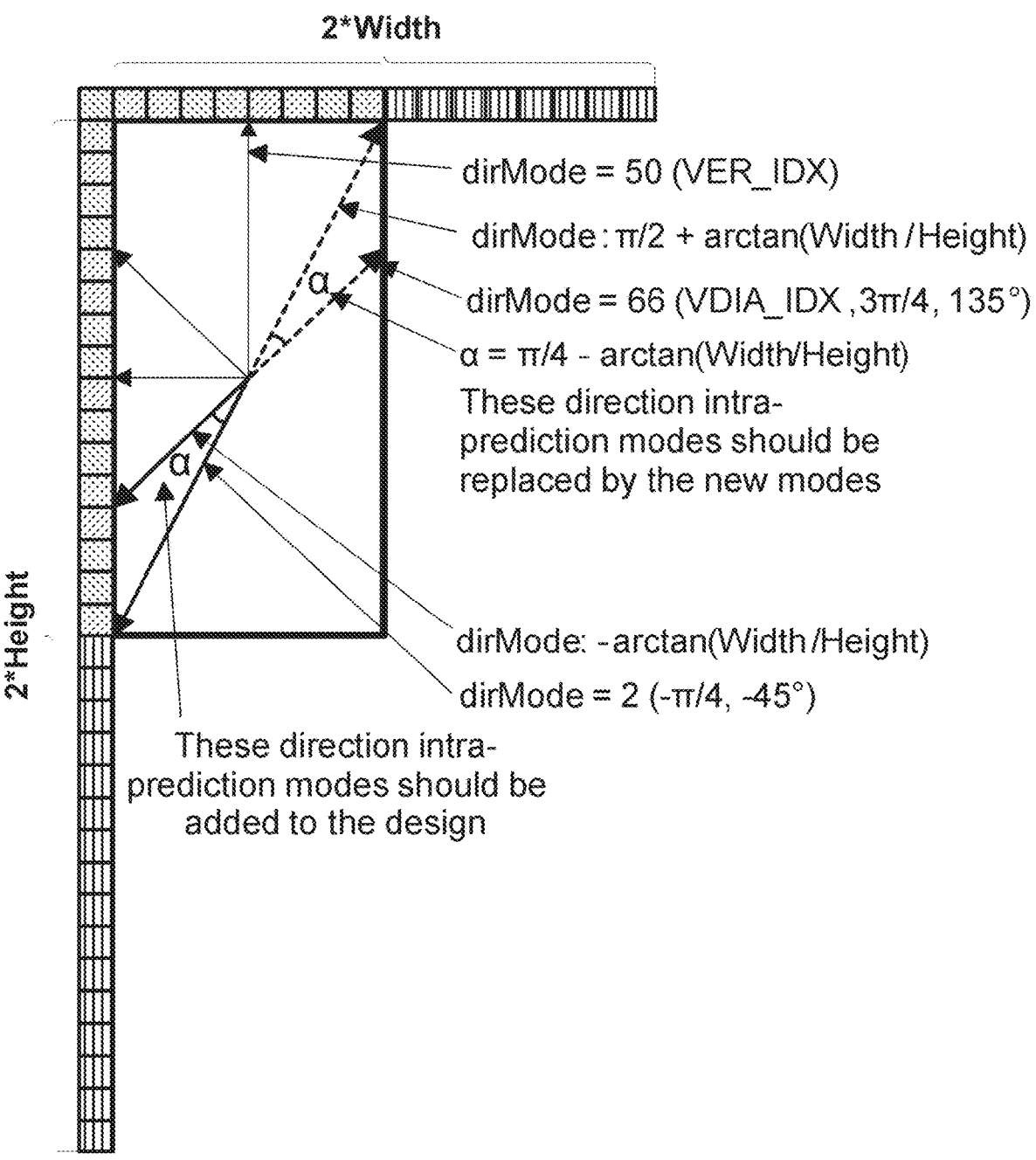
FIG. 10 shows a schematic diagram illustrating a preservation of a cardinality of directional intra-prediction modes subject to an aspect ratio of a given rectangular video coding block.

FIG. 10 shows a schematic diagram illustrating a preservation of a cardinality of directional intra-prediction modes subject to an aspect ratio of a given rectangular video coding block. As shown in FIG. 10, the amount of the directional intra-prediction modes added along the longer side (the angle that encompasses these modes is marked by a solid line) may be equal to the amount of the directional intra-prediction modes removed along the shorter side (the angle that encompasses these modes is marked by a dashed lines). Thus, the cardinality of the intra-prediction mode set remains the same as for square blocks.

According to an embodiment, whether to extend a set of available intra-prediction modes or not can also depend on the availability of reference samples because they are needed to generate an intra-predictor.

Figure 11:
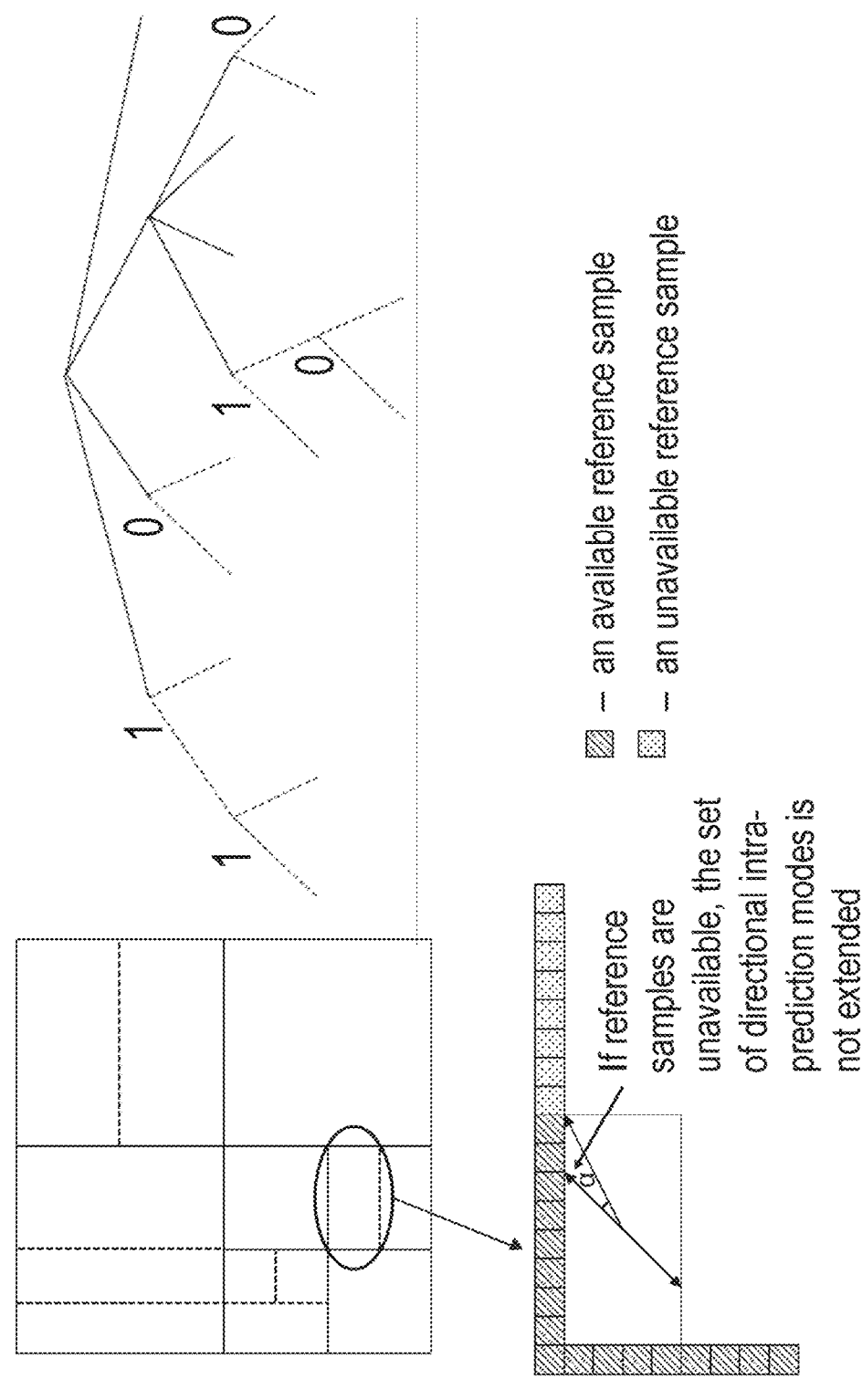
FIG. 11 illustrates an example of block partitioning and a corresponding tree structure by using quad-tree plus binary-tree (QTBT), wherein the number of available reference samples along a longer side is less than its double length in a rectangular video coding block.

FIG. 11 illustrates an example of block partitioning and a corresponding tree structure by using quad-tree plus binary-tree (QTBT), wherein the number of available reference samples along a longer side is less than its double length in a rectangular video coding block. As shown in FIG. 11, the quad-tree plus binary-tree (QTBT) partitioning framework produces a partitioning, wherein the actual number of available reference samples along a longer side is less than its double length as assumed in the above examples in FIGS. 9 and 10. Therefore, the approach for increasing the number of the directional intra-prediction modes in the above examples may need to be adjusted according to an availability of reference samples for the case of FIG. 11.

Figure 12:
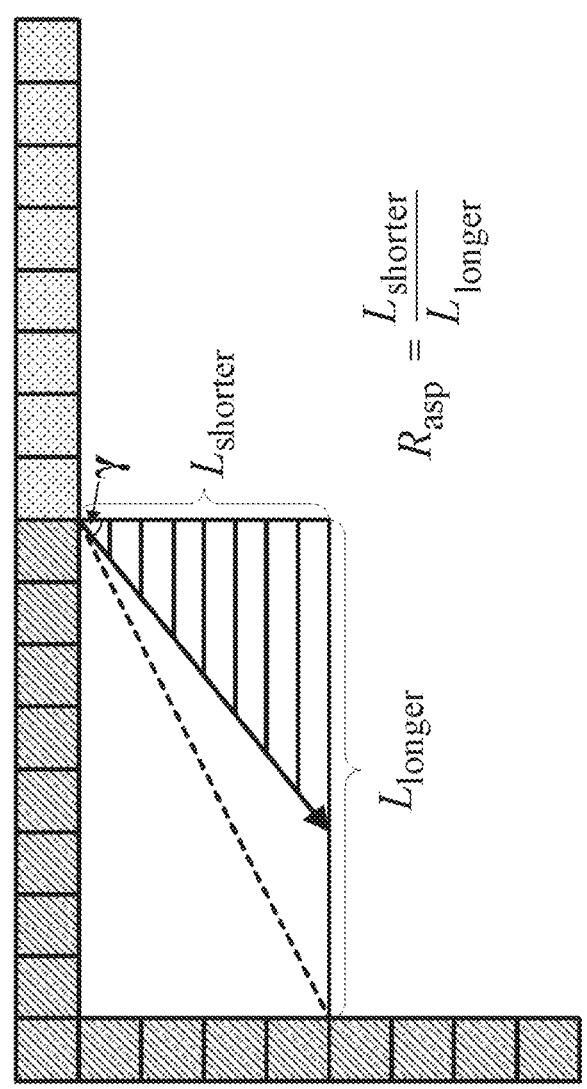
FIG. 12 illustrates enabling or disabling a set of directional intra-prediction modes subject to an availability of reference samples of a given rectangular video coding block.

FIG. 12 illustrates enabling or disabling a set of directional intra-prediction modes subject to an availability of reference samples of a given rectangular video coding block within the quad-tree plus binary-tree (QTBT) partitioning framework, wherein a grey rectangle area represents a currently processed video coding block, square pixels with diagonal stripes indicate available reference samples, and square pixels with dots indicate unavailable reference samples. Disabling can e.g. be achieved by removing a respective directional intra-prediction mode from the set.

A fractional non-prediction area P of a rectangular video coding block generated using interpolated reference samples may be calculated as follows:

$$P_{area} = \frac{S_{uncov}}{S_{block}} = \frac{S_{uncov}}{L_{shorter} \cdot L_{longer}} = \frac{L_{shorter}^2 \cdot \tan\gamma}{2 \cdot L_{shorter} \cdot L_{longer}} =$$
$$= \frac{L_{shorter} \cdot \tan\gamma}{2 \cdot L_{longer}} = \frac{L_{shorter}}{L_{longer}} \cdot \frac{\tan\gamma}{2} = R_{asp} \cdot \frac{\tan\gamma}{2}$$

wherein $L_{longer}$ and $L_{shorter}$ are the lengths of the longer and shorted sides of a rectangular video coding block, respectively, $\gamma$ is the angle of a given directional intra-prediction mode belonging to the extended set, $S_{block}=L_{shorter} \cdot L_{longer}$ is the area of a rectangular video coding block to be predicted, $$S_{uncov} = \frac{L_{shorter}^2 \cdot \tan\gamma}{2}$$

is the non-prediction area, i.e. the area of the video coding block that may not be predicted using non-interpolated reference samples, as marked by stripes.

Therefore, the closer an intra-prediction direction is located to the diagonal marked by a dashed line, the larger part of an area that remains may not be predicted using non-interpolated reference samples. In an example, the set of directional intra-prediction modes is not extended if the length $L_{RSlonger}$ of non-interpolated reference samples along the longer side is less than the double length of the longer side:

$$L_{RSlonger} < 2L_{longer}.$$

If a set of directional intra-prediction modes is extended, it is desirable to signal the newly extended modes, which may not be accomplished using existing conventional mechanisms. For this purpose, a 2-step signaling mechanism for the extension of directional intra-prediction modes is set forth and explained in FIGS. 13 and 14.

Figure 13:
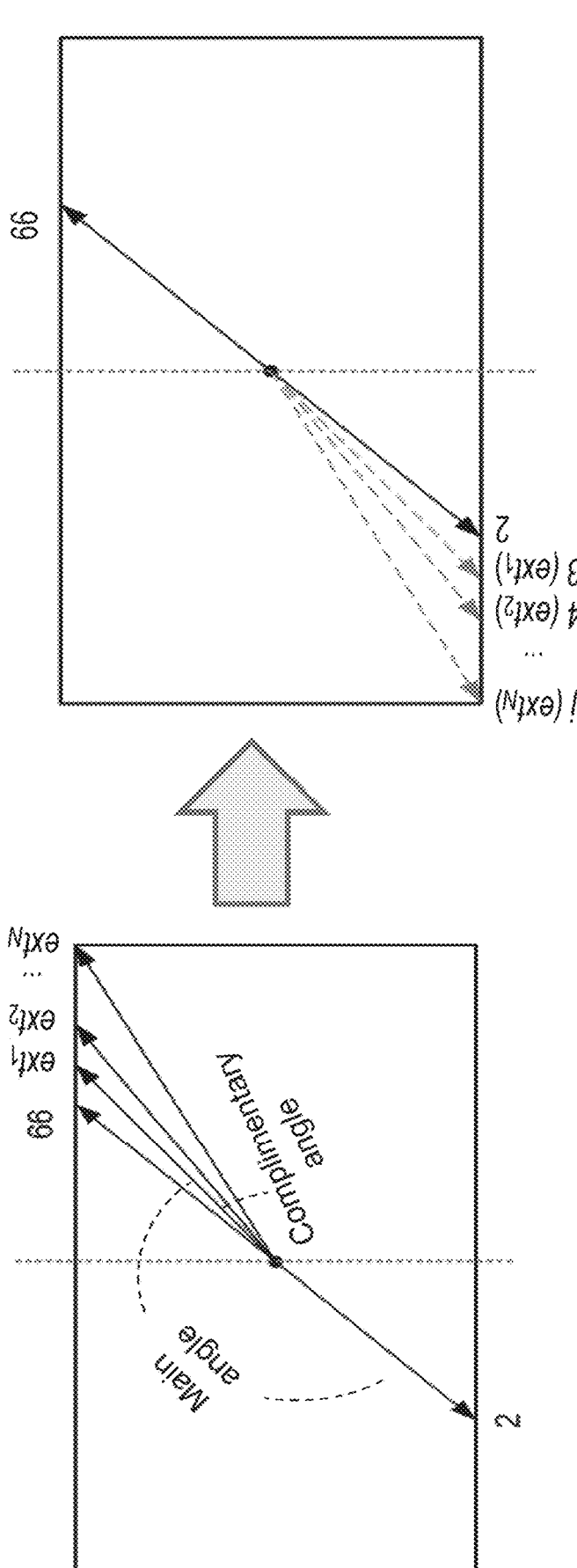
FIG. 13 illustrates a first step of a signaling mechanism for extension of directional intra-prediction modes.

FIG. 13 illustrates a first step of a signaling mechanism for extension of directional intra-prediction modes, wherein a set of extended modes is mapped to a conventional set of intra-prediction modes using a mirroring procedure.

Figure 14:
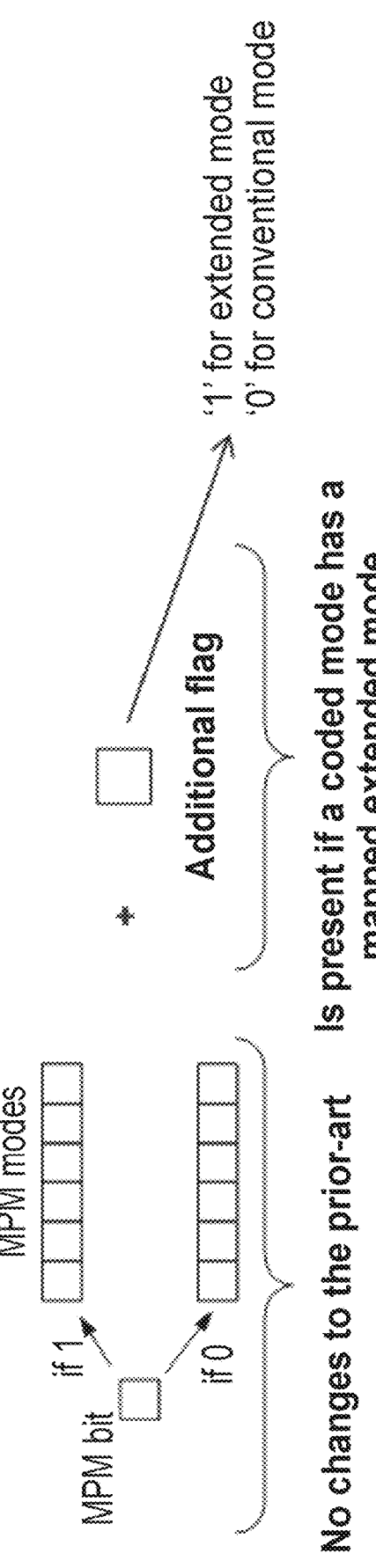
FIG. 14 illustrates a second step of a signaling mechanism for extension of directional intra-prediction modes.

FIG. 14 illustrates a second step of a signaling mechanism for extension of directional intra-prediction modes, wherein a one-bit flag is used to distinguish between conventional and extended directional modes. The flag is assigned a value "0" for a conventional mode and "1" for an extended mode. Furthermore, the flag in the signaling mechanism is used only for those directional modes that are reflections of extended ones.

Figure 15:
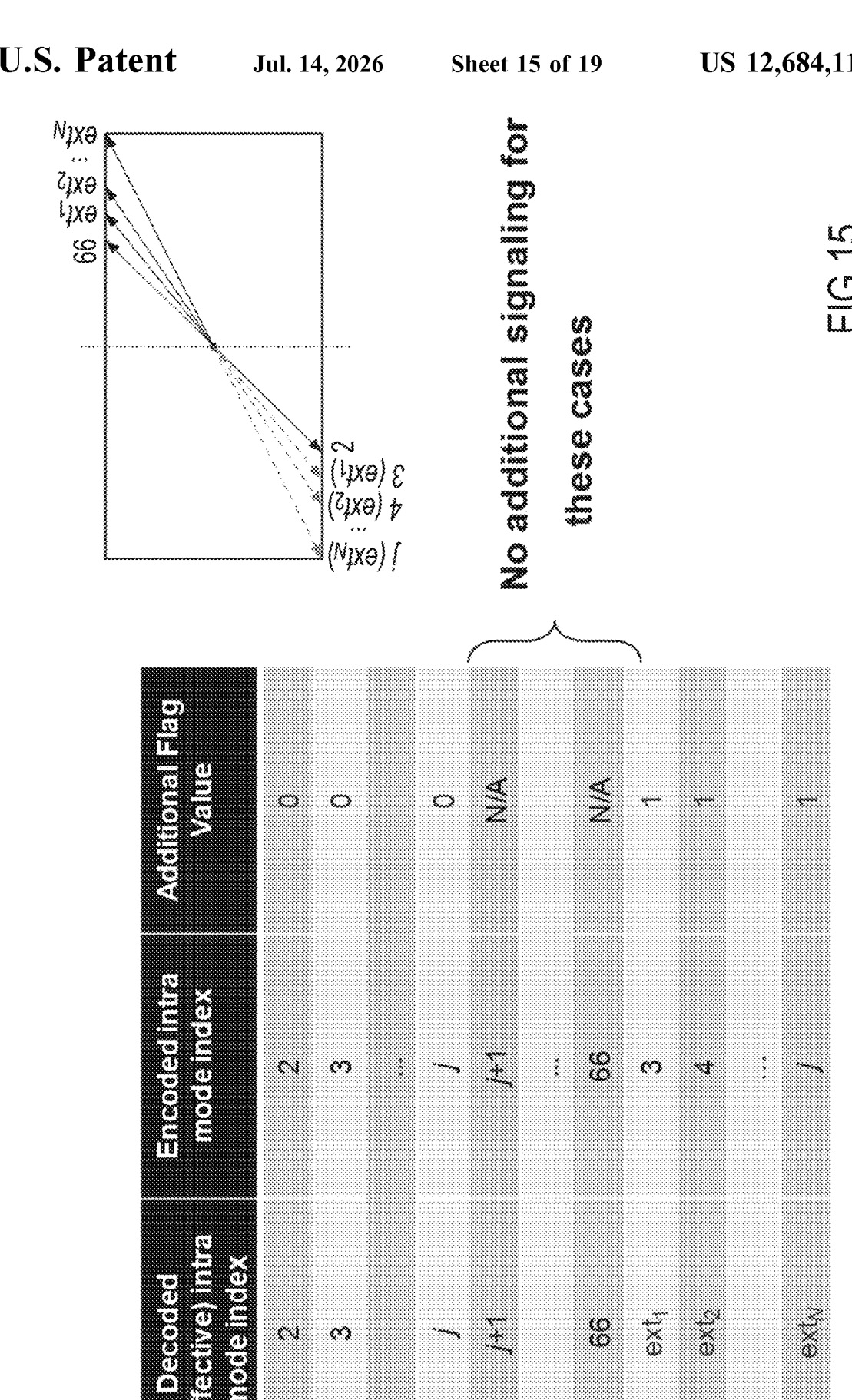
FIG. 15 illustrates a decoding process for a directional intra mode index by applying a signaling mechanism.

FIG. 15 illustrates a decoding process for a directional intra mode index by applying a signaling mechanism. As shown in FIG. 15, the extended modes of the directional intra-prediction are flagged with "1", the conventional modes having a mapped mode are flagged with "0", and the other modes have no additional signaling value.

Figure 16:
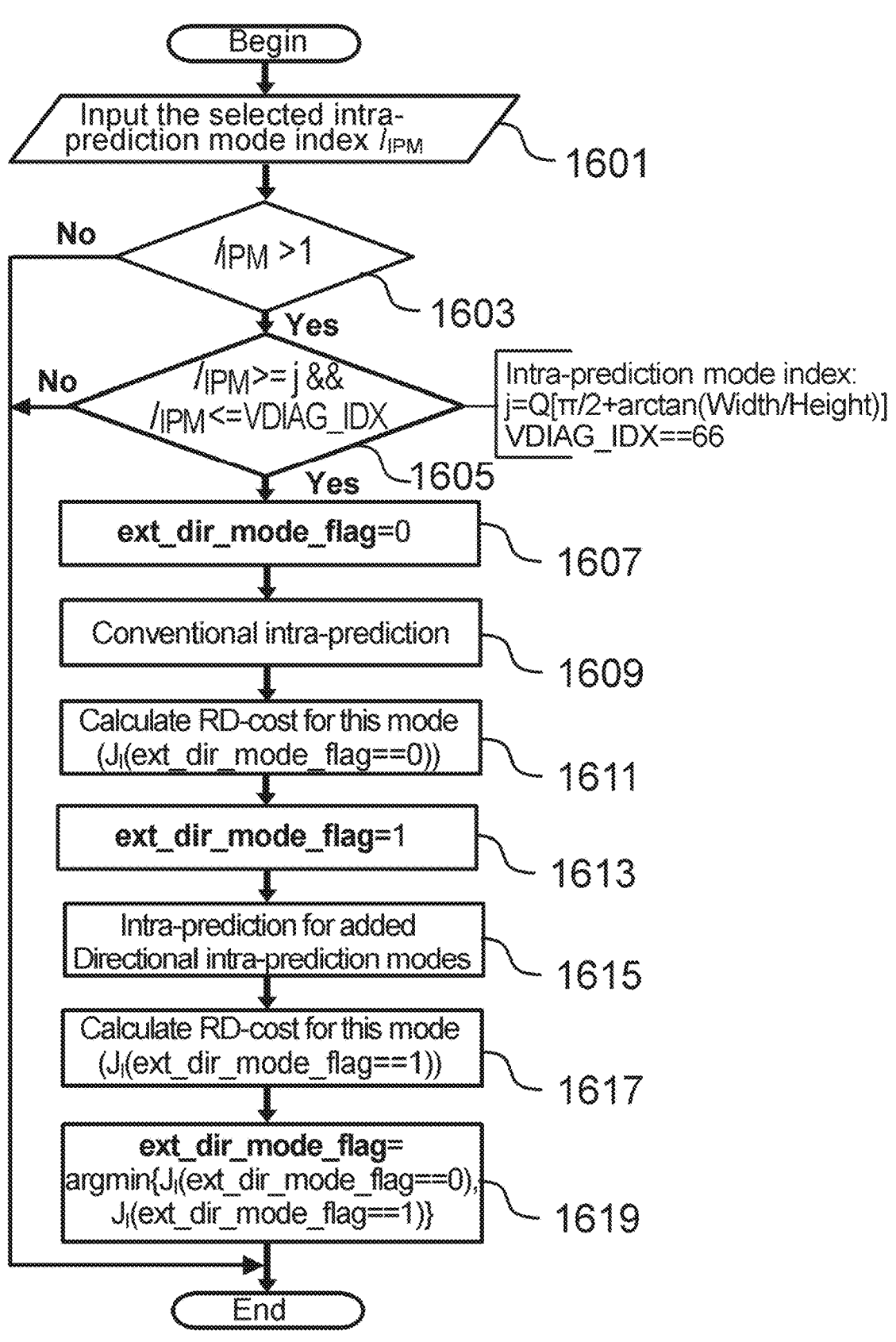
FIG. 16 shows a schematic diagram illustrating an implementation of a signaling mechanism applied in an encoding apparatus.

FIG. 16 shows a schematic diagram illustrating an implementation of a signaling mechanism applied in an encoding apparatus. In a first processing step 1601 the index of the intra-prediction mode $I_{IPM}$ is parsed from the bitstream. Thereafter, in processing step 1603 a decision is taken depending on whether the decoded intra-prediction mode is a directional intra prediction mode. In the case the signaling scheme is applied in the context of HEVC video coding, the intra-prediction mode is directional when $I_{IPM}$ is greater than 1. If the intra-prediction mode is directional, in processing step 1605 a decision is taken depending on whether the decoded intra-prediction mode is extended. The decoded intra-prediction mode is extended when $I_{IPM}$ is greater than Q[π/2+arctan (Width/Height)] and smaller than VDI-AG_IDX, wherein Width and Height are the lengths of short and long sides of a rectangular video coding block being decoded, and VDIAG_IDX is equal to 66 according to embodiments of the invention. Then, the flag "ext_dir_mode_flag" is assigned to a value of 0 for the conventional modes which can have mapped extended code (see processing steps 1607, 1609). A rate-distortion cost (RD-cost) is estimated for the conventional modes in processing step 1611. The flag "ext_dir_mode_flag" is assigned to a value of 1 for the extended modes (see processing steps 1613, 1615). A rate-distortion cost (RD-cost) for the conventional modes is estimated in processing step 1617. The flag "ext_dir_mode_flag" is determined by finding the lowest rate-distortion cost (RD-cost) between the conventional modes and extended modes in processing step 1619.

Figure 17:
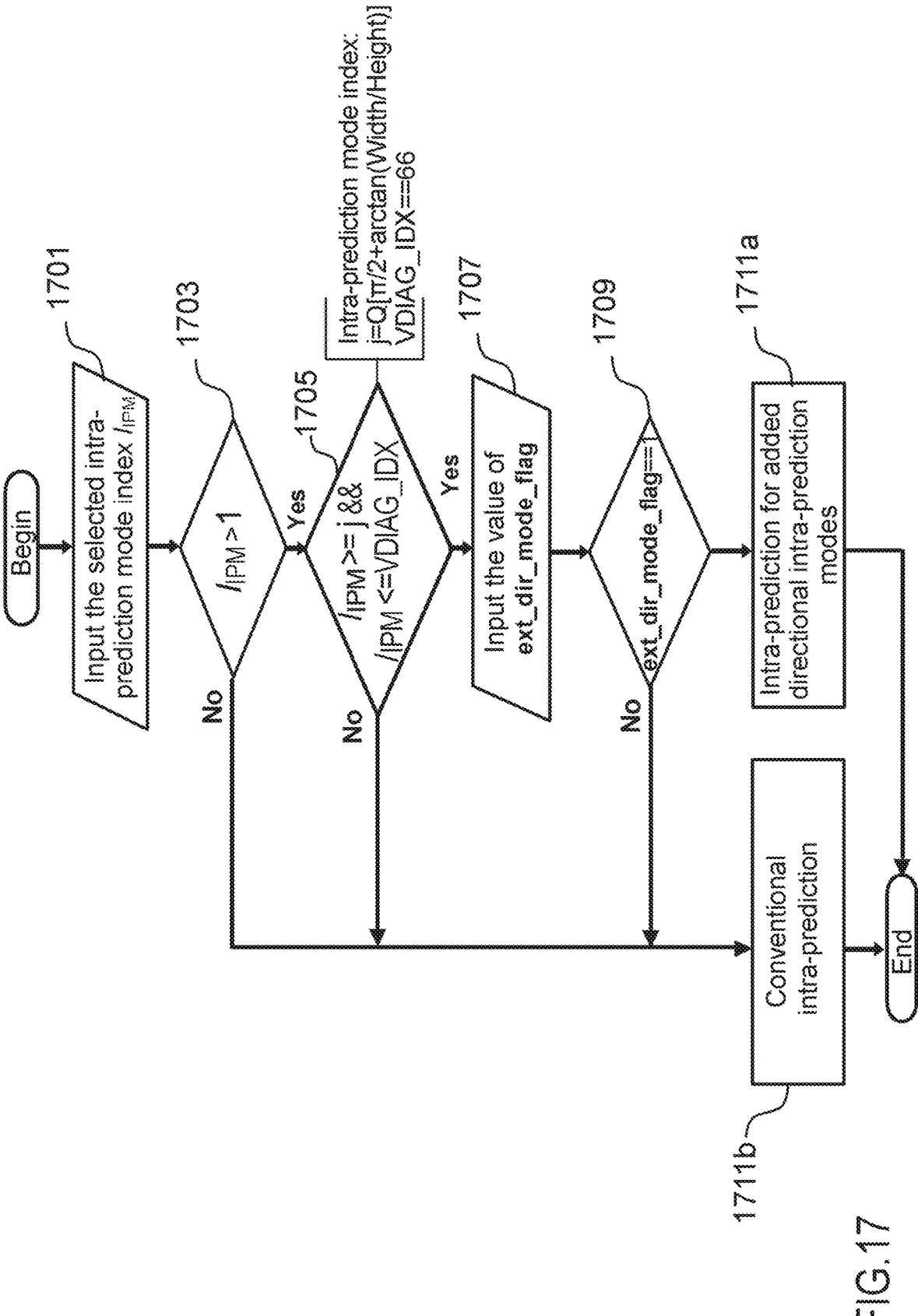
FIG. 17 shows a schematic diagram illustrating an implementation of a signaling mechanism applied in a decoding apparatus.

FIG. 17 shows a schematic diagram illustrating an implementation of a signaling mechanism applied in a decoding apparatus. In a first processing step 1701 the index of the intra-prediction mode $I_{IPM}$ is parsed from the bitstream.

Thereafter, in processing step 1703 a decision is taken depending on whether the decoded intra prediction mode is a directional intra prediction mode. In the case the signaling scheme is applied in the context of HEVC video coding, the intra prediction mode is directional when $I_{IPM}$ is greater than 1. If the intra-prediction mode is directional, in processing step 1705 a decision is taken depending on whether the decoded intra-prediction mode is extended. The decoded intra-prediction mode is extended when $I_{IPM}$ is greater than Q[π/2+arctan (Width/Height)] and smaller than VDI-AG_IDX, wherein Width and Height are the lengths of short and long sides of a rectangular block being decoded, and VDIAG_IDX is equal to 66 according to embodiments of the invention. For extended directional intra-prediction modes the value of the flag "ext_dir_mode_flag" is parsed from the bitstream in processing step 1707. According to embodiments of the invention this flag is introduced into the bitstream to code whether to apply the disclosed mechanism to the prediction unit. In processing step 1709, a decision is taken to use either the extended prediction scheme if ext_dir_mode_flag is equal to 1 (processing step 1711a) or the conventional prediction if ext_dir_mode_flag is not equal to 1 (processing step 1711b), as provided by embodiments of the invention, for obtaining the predicted signal. The decision in processing step 1709 is taken on the basis of the value of the flag "ext_dir_mode_flag", which has been determined in processing step 1707.

The signaling mechanism is applicable to a wider spectrum of cases according to embodiments of the invention. For example, it can be used to reduce a signaling overhead caused by an extended set of directional intra-prediction modes used in Enhanced Intra-Prediction (EIP) technique proposed by Google for its VPX codec family. This EIP technique is needed to improve the compression efficiency of intra-predicted blocks within inter-predicted pictures. EIP is a two-pass mechanism for increasing the number of available prediction directions, wherein blocks with good inter-prediction modes are initially encoded, and then intra blocks with access to more boundaries are filled in.

Figure 18:
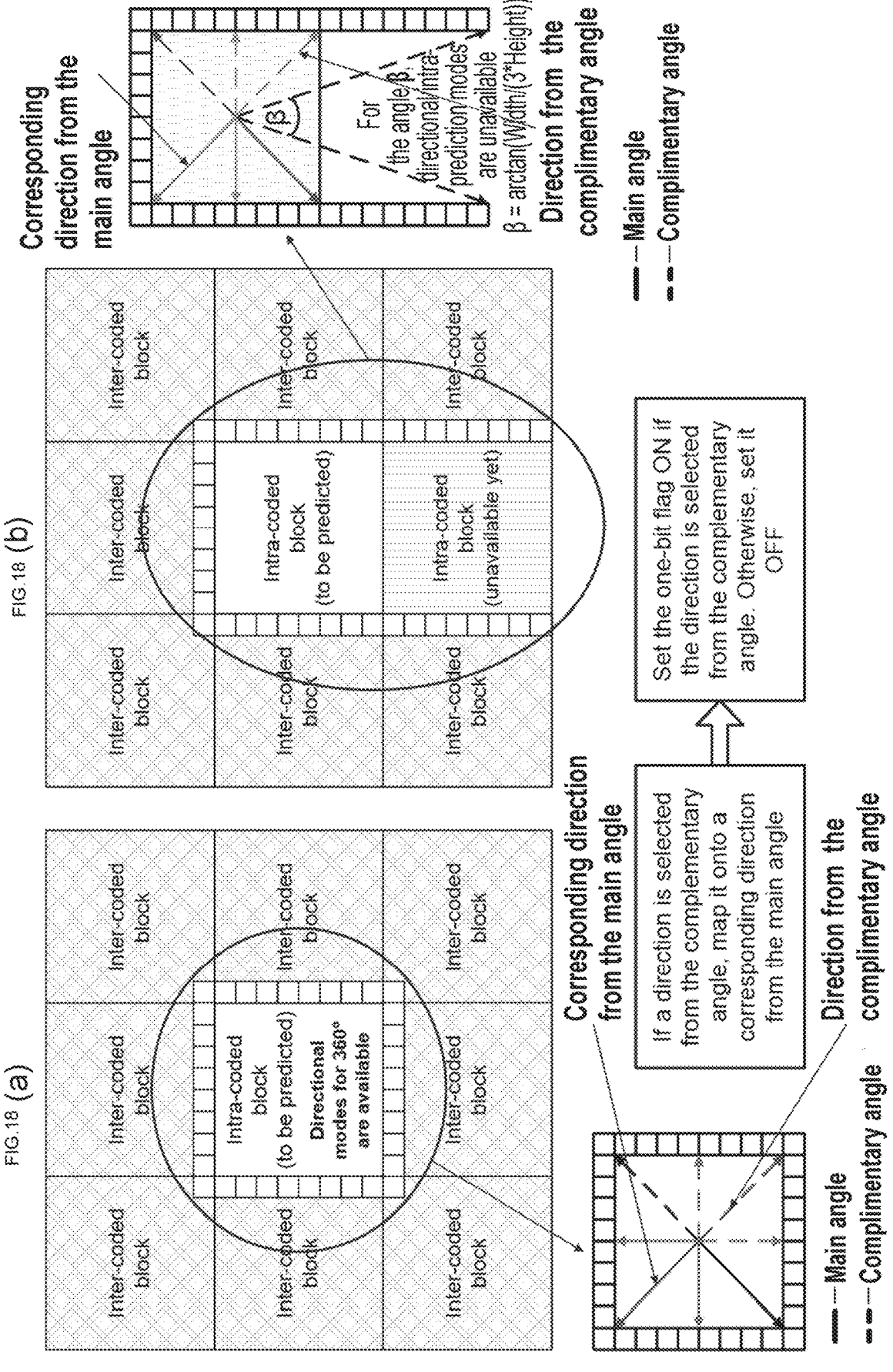
FIGS. 18(a) and 18(b) show schematic diagrams illustrating implementations of a signaling mechanism applied to the Enhanced Intra-Prediction (EIP) mechanism.

FIGS. 18(a) and 18(b) show schematic diagrams illustrating implementations of a signaling mechanism applied to the Enhanced Intra-Prediction (EIP) mechanism. In the cases shown in FIGS. 18(a) and 18(b), 4(2π) and 3 (3π/2) sides of a video coding block are available for directional intra-prediction, respectively. Solid lines denote directions from a main angle and dashed lines denote directions from a complimentary angle. In both cases, the set of available intra-prediction modes is more than for a conventional case.

As described above, the same 2-step signaling mechanism can be conducted to signal what angle the selected directional intra-prediction mode belongs to by using a one-bit flag. Firstly, a directional mode can be mapped onto the main angle if the directional mode is selected from the complementary angle. Secondly, the one-bit flag can be set to "ON" if the direction is selected from the complementary angle; otherwise, the flag can be set to "OFF".

Figure 19:
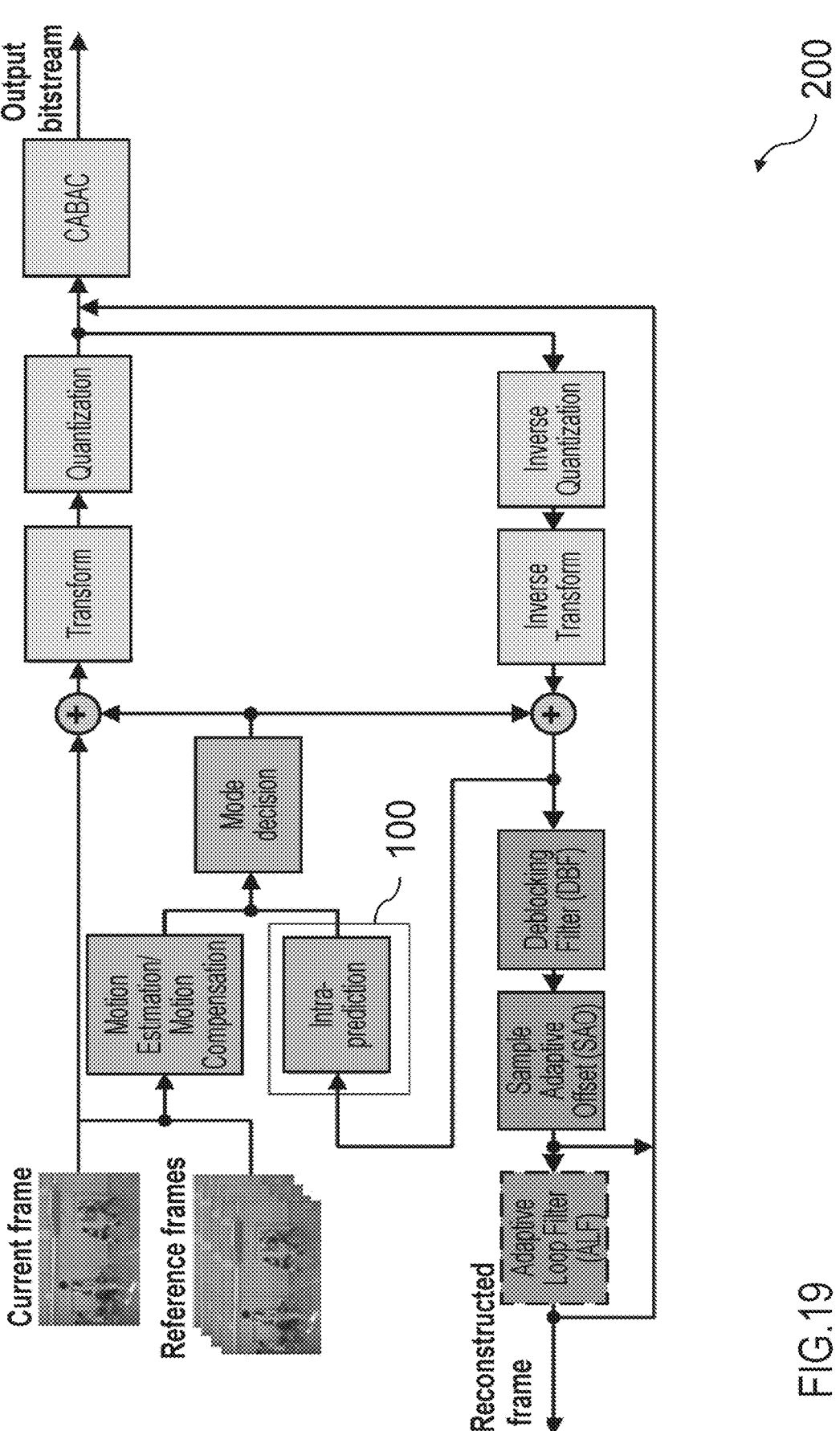
FIG. 19 shows a schematic diagram of an encoding apparatus for encoding a rectangular video coding block comprising an intra-prediction apparatus.

FIG. 19 shows a schematic diagram of an encoding apparatus 200 for encoding a rectangular video coding block comprising an intra-prediction apparatus 100. A decoding apparatus 300 can be implemented analogously.

While a particular feature or aspect of the disclosure may have been disclosed with respect to only one of several implementations or embodiments, such a feature or aspect may be combined with one or more further features or aspects of the other implementations or embodiments as may be desired or advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives thereof may have been used. It should be understood that these terms may have been used to indicate that two elements cooperate or interact with each other regardless whether they are in direct physical or electrical contact, or they are not in direct contact with each other.

Although exemplary aspects have been illustrated and described herein, it will be appreciated that a variety of alternate and/or equivalent implementations may be substituted for the exemplary aspects shown and described without departing from the scope of the present disclosure. This application may cover any adaptations or variations of the exemplary aspects discussed herein.

Although elements in the following claims may be recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present disclosure has been described with reference to one or more exemplary embodiments, those skilled in the art recognize that many changes may be made thereto without departing from the scope of the present invention. It is therefore to be understood that within the scope of the appended claims and their equivalents, embodiments of the invention may be practiced otherwise than as specifically described herein.

What is claimed is:

1. An intra-prediction method, comprising:
   obtaining, by an intra-prediction apparatus, a first directional intra-prediction mode;
   determining, by the intra-prediction apparatus, for a rectangular video coding block, a second directional intra-prediction mode based on the first directional intra-prediction mode, wherein the rectangular video coding block has a first side and a second side, and wherein a length of the first side is different from a length of the second side; and
   intra-predicting, by the intra-prediction apparatus, pixel values of pixels of the rectangular video coding block based on the second directional intra-prediction mode, wherein intra-predicting the pixel values of the pixels of the rectangular video coding block uses a first number of reference samples along the first side and a second number of reference samples along the second side, wherein the first number and the second number are different.

2. The intra-prediction method of claim 1, wherein an angle of the first directional intra-prediction mode is within a range [−45°, 135°], and an angle of the second directional intra-prediction mode is beyond the range [−45°, 135°].

3. The intra-prediction method of claim 1, wherein determining the second directional intra-prediction mode for the rectangular video coding block is further based on an aspect ratio of the rectangular video coding block.

4. The intra-prediction method of claim 3, wherein the second side of the rectangular video coding block is longer than the first side of the rectangular video coding block, and wherein the aspect ratio of the rectangular video coding block is $$R_{asp} = \frac{L_{shorter}}{L_{longer}},$$

where $L_{shorter}$ and $L_{longer}$ are the lengths of the first and second sides of the rectangular video coding block, respectively.

5. The intra-prediction method of claim 1, wherein the rectangular video coding block is a coding unit, a prediction unit, or a transform unit.

6. The intra-prediction method of claim 1, wherein the first directional intra-prediction mode is applicable to both square video coding blocks and non-square rectangular video coding blocks, and wherein the second directional intra-prediction mode is applicable to non-square rectangular video coding blocks.

7. The intra-prediction method of claim 6, wherein the second directional intra-prediction mode is not applicable to square video coding blocks.

8. An intra-prediction apparatus, comprising:
a non-transitory computer-readable storage medium storing instructions; and
one or more processors in communication with the non-transitory computer-readable storage medium, wherein the one or more processors are configured to execute the instructions to facilitate the following being performed by the apparatus:
obtaining a first directional intra-prediction mode;
determining, for a rectangular video coding block, a second directional intra-prediction mode based on the first directional intra-prediction mode, wherein the rectangular video coding block has a first side and a second side, and wherein a length of the first side is different from a length of the second side; and
intra-predicting pixel values of pixels of the rectangular video coding block based on the second directional intra-prediction mode, wherein intra-predicting the pixel values of the pixels of the rectangular video coding block uses a first number of reference samples along the first side and a second number of reference samples along the second side, wherein the first number and the second number are different.

9. The intra-prediction apparatus of claim 8, wherein an angle of the first directional intra-prediction mode is within a range [−45°, 135°], and an angle of the second directional intra-prediction mode is beyond the range [−45°, 135°].

10. The intra-prediction apparatus of claim 8, wherein determining the second directional intra-prediction mode for the rectangular video coding block is further based on an aspect ratio of the rectangular video coding block.

11. The intra-prediction apparatus of claim 10, wherein the second side of the rectangular video coding block is longer than the first side of the rectangular video coding block, and wherein the aspect ratio of the rectangular video coding block is $$R_{asp} = \frac{L_{shorter}}{L_{longer}},$$

where $L_{shorter}$ and $L_{longer}$ are the lengths of the first and second sides of the rectangular video coding block, respectively.

12. The intra-prediction apparatus of claim 8, wherein the first directional intra-prediction mode is applicable to both square video coding blocks and non-square rectangular video coding blocks, and wherein the second directional intra-prediction mode is applicable to non-square rectangular video coding blocks.

13. The intra-prediction apparatus of claim 12, wherein the second directional intra-prediction mode is not applicable to square video coding blocks.

14. The intra-prediction apparatus of claim 8, wherein the rectangular video coding block is a coding unit, a prediction unit, or a transform unit.

15. The intra-prediction apparatus of claim 8, wherein the apparatus is a decoder or an encoder.

16. A non-transitory computer readable medium having processor-executable instructions stored thereon for intra-prediction, wherein the processor-executable instructions, when executed, facilitate:
obtaining a first directional intra-prediction mode;
determining, for a rectangular video coding block, a second directional intra-prediction mode based on the first directional intra-prediction mode, wherein the rectangular video coding block has a first side and a second side, and wherein a length of the first side is different from a length of the second side; and
intra-predicting pixel values of pixels of the rectangular video coding block based on the second directional intra-prediction mode, wherein intra-predicting the pixel values of the pixels of the rectangular video coding block uses a first number of reference samples along the first side and a second number of reference samples along the second side, wherein the first number and the second number are different.

17. The non-transitory computer readable medium of claim 16, wherein an angle of the first directional intra-prediction mode is within a range [−45°, 135°], and an angle of the second directional intra-prediction mode is beyond the range [−45°, 135°].

18. The non-transitory computer readable medium of claim 16, wherein determining the second directional intra-prediction mode for the rectangular video coding block is further based on an aspect ratio of the rectangular video coding block.

19. The non-transitory computer readable medium of claim 18, wherein the second side of the rectangular video coding block is longer than the first side of the rectangular video coding block, and wherein the aspect ratio of the rectangular video coding block is $$R_{asp} = \frac{L_{shorter}}{L_{longer}},$$

where $L_{shorter}$ and $L_{longer}$ are the lengths of the first and second sides of the rectangular video coding block, respectively.

20. The non-transitory computer readable medium of claim 16, wherein the first directional intra-prediction mode is applicable to both square video coding blocks and non-square rectangular video coding blocks, and wherein the second directional intra-prediction mode is applicable to non-square rectangular video coding blocks.

* * * * *